US006556942B1

(12) United States Patent
Smith

(10) Patent No.: US 6,556,942 B1
(45) Date of Patent: Apr. 29, 2003

(54) SHORT RANGE SPREAD-SPECTRUM RADIOLOCATION SYSTEM AND METHOD

(75) Inventor: Stephen F. Smith, Loudon, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 09/676,401

(22) Filed: Sep. 29, 2000

(51) Int. Cl.$^7$ ............... G01C 17/00; G01S 3/02; H04K 1/00
(52) U.S. Cl. ............... 702/150; 342/99; 342/450; 375/149
(58) Field of Search ............... 702/143, 149, 702/150, 151; 342/99, 352, 363, 450, 457, 463, 465; 375/135, 142, 149, 259

(56) References Cited

U.S. PATENT DOCUMENTS

| | | | |
|---|---|---|---|
| 4,665,404 A | 5/1987 | Christy et al. | 342/463 |
| 4,797,677 A | 1/1989 | MacDoran et al. | 342/352 |
| 4,894,662 A | 1/1990 | Counselman | 342/357.12 |
| 5,056,106 A | 10/1991 | Wang et al. | 375/130 |
| 5,119,104 A | 6/1992 | Heller | 342/450 |
| 5,216,429 A | 6/1993 | Nakagawa et al. | 342/45 |
| 5,422,908 A | 6/1995 | Schilling | 375/130 |
| 5,437,055 A | 7/1995 | Wheatley, III | 455/562 |
| 5,495,499 A | 2/1996 | Fenton et al. | 370/479 |
| 5,517,406 A | 5/1996 | Harris et al. | 705/30 |
| 5,552,772 A | 9/1996 | Janky et al. | 340/573.4 |
| 5,608,712 A | 3/1997 | Rilum et al. | 369/116 |
| 5,818,977 A | * 10/1998 | Tansley | 382/294 |
| 5,828,693 A | 10/1998 | Mays et al. | 375/457 |
| 5,917,449 A | 6/1999 | Sanderford et al. | 342/457 |
| 6,049,302 A | * 4/2000 | Hinckley, Jr. | 342/99 |
| 6,121,926 A | * 9/2000 | Belcher et al. | 342/450 |
| 6,127,976 A | * 10/2000 | Boyd et al. | 342/463 |
| 6,150,921 A | * 11/2000 | Werb et al. | 340/10.1 |
| 6,353,406 B1 | * 3/2002 | Lanzl et al. | 342/118 |

FOREIGN PATENT DOCUMENTS

| | | | | |
|---|---|---|---|---|
| WO | WO 93/23765 | 11/1993 | | G01S/11/08 |
| WO | WO 96/25673 | 8/1996 | | G01S/5/14 |
| WO | WO 99/30181 | 6/1999 | | G01S/5/06 |

OTHER PUBLICATIONS

Dixon, "Spread spectrum systems with commercial applications," *John Wiley & Sons, Inc.*, pp 307–312, 1994.
Kaplan, "The global positioning system (GPS)," *Communications Quarterly*, pp 13–27, Summer 1994.
Werb and Lanzl, "Designing a positioning system for finding things and people indoors," *IEEE Spectrum*, pp 71–78, 1998.
International Search Report mailed May 28, 2002 for International Application No. PCT/US01/30884.

* cited by examiner

Primary Examiner—John Barlow
Assistant Examiner—John Le
(74) Attorney, Agent, or Firm—Gray Cary Ware & Freidenrich, LLP

(57) ABSTRACT

A short range radiolocation system and associated methods that allow the location of an item, such as equipment, containers, pallets, vehicles, or personnel, within a defined area. A small, battery powered, self-contained tag is provided to an item to be located. The tag includes a spread-spectrum transmitter that transmits a spread-spectrum code and identification information. A plurality of receivers positioned about the area receive signals from a transmitting tag. The position of the tag, and hence the item, is located by triangulation. The system employs three different ranging techniques for providing coarse, intermediate, and fine spatial position resolution. Coarse positioning information is provided by use of direct-sequence code phase transmitted as a spread-spectrum signal. Intermediate positioning information is provided by the use of a difference signal transmitted with the direct-sequence spread-spectrum code. Fine positioning information is provided by use of carrier phase measurements. An algorithm is employed to combine the three data sets to provide accurate location measurements.

12 Claims, 12 Drawing Sheets

SHORT RANGE SPREAD-SPECTRUM RADIOLOCATION SYSTEM AND METHOD

STATEMENT AS TO RIGHTS TO INVENTIONS MADE UNDER FEDERALLY-SPONSORED RESEARCH AND DEVELOPMENT

This invention was made with United States Government support awarded by the United States Department of Energy under contract to UT-Battelle, LLC. The United States has certain rights in this invention.

BACKGROUND OF THE INVENTION

1. Field of the Invention

The invention relates generally to radiolocation, and more particularly relates to a short-range radiolocation system suitable for smaller areas, indoor applications, and cost-critical products such as asset and personnel tags for providing high accuracy position data for situations where Global Positioning Satellite (GPS) systems are either ineffective or too expensive.

2. Discussion of the Related Art

The Global Positioning System (GPS) is a satellite-based navigation system known to be of great utility in many wide-area, outdoor scenarios, particularly in military and commercial navigational applications. This system lets a user with a GPS receiver determine his or her location on the earth with a high degree of accuracy, based on signals received from satellites orbiting the earth. Although this system was developed primarily for military use by the United States Department of Defense, civilian uses have exploded in recent years.

In certain navigational and positioning applications, e.g. industrial, military, transportation, and emergency assistance, there is a need for accurately determining the location of personnel, equipment, containers, personnel, and other assets in smaller areas such as plant buildings, warehouses, staging areas, storage facilities, and production line areas. The GPS generally has poor coverage inside buildings, under forest canopies or heavy foliage, or in highly developed urban areas where tall structures dominate. Multi-path effects of the radio signals from the satellites seriously deteriorate GPS accuracy in situations involving tall structures such as skyscrapers. Furthermore, known GPS receiving hardware is currently too large and costly for mass implementation applications, for example, where there is a need for identifying and locating unattended assets such as an item of equipment, a pallet or container of goods, a vehicle, etc.

GPS operates to determine the position of a user with a receiver by receiving signals transmitted by a plurality of GPS satellites orbiting the earth. The user's position on the surface of the earth is calculated relative to the center of the earth by triangulation based on signals received from multiple (usually 4: or more) GPS satellites. The distance from the user to a satellite is computed by measuring the propagation time required for a direct-sequence spread-spectrum "ranging code" signal transmitted by a satellite to reach the receiver.

A ranging code is a pseudorandom code sequence that is generated by a polynomial generator according to a known algorithm, each bit of which is called a "chip" to distinguish it from the true data bits that might form a message encoded onto the ranging code. A "chip" is a single bit in a pseudo-random code sequence used to spread the spectrum of an information signal. The pseudorandom ranging code sequence, when broadcast by radio, has a spectrum that has widely dispersed sidebands relative to the carrier frequency, and thus is referred to as a "spread-spectrum" signal. Spread-spectrum signals are known to have desirable characteristics for data security and resistance to radio-frequency (RF) interference.

Within a GPS receiver, an identical ranging code signal is generated and shifted in time (or phase) until it achieves correlation with the specific satellite-generated ranging code being acquired. The magnitude of the time shift of the identical ranging code signal within the receiver relative to the satellite transmitted ranging code provides a time differential that is related to the satellite-to-user range.

To determine user position in three dimensions, range measurements are made to a plurality of satellites, resulting in four simultaneous ranging equations that have four unknowns. These equations can be solved by computer systems to determine the values of x, y, z (the 3-dimensional location of the user's receiver), and t, which is a clock error. There are several closed-form solutions furnished in the literature for solving the equation to determine the unknown quantities.

The positioning is in general accomplished by determining the time-of-flight of the signals from at least 4 GPS satellites, and by careful processing of the real-time data from the multiple satellite clocks (and other, small corrections) the actual distances are computed; the common solution to the set simultaneous distance equations, coupled to the known satellite locations, provides the GPS receiver's position. Thus, the geometric range is given by:

$$r = c(T_u - T_s) = c\Delta t, \quad (1)$$

where $T_s$=system time when signal left the satellite;
$T_u$=system time when signal reached the receiver;
$\delta_t$=offset of satellite clock from system time;
$t_u$=offset of receiver clock from system time;
$T_s + \delta t$=satellite clock reading when signal left satellite;
$T_u + t_u$=receiver clock reading when signal, arrived;
c=speed of light;
$(x_u, y_u, z_u)$=position of the receiver in 3 dimensions; and
$(x_j, y_j, z_j)$=3-dimensional position of the jth satellite (j=1 to 4).

In these terms, the pseudorange is given by:

$$\rho = c[(T_u + t_u) - (T_s + \delta t)] = c(T_u - T_s) + c(t_u - \delta t) = r + c(t_u - \delta t) \quad (2)$$

and the 4 pseudoranges are thus:

$$\rho_1 = [(x_1 - x_u)^2 + (y_1 - y_u)^2 + (z_1 - z_u)^2]^{1/2} c t_u \quad (3)$$

$$\rho_2 = [(x_2 - x_u)^2 + (y_2 - y_u)^2 + (z_2 - z_u)^2]^{1/2} c t_u \quad (4)$$

$$\rho_3 = [(x_3 - x_u)^2 + (y_3 - y_u)^2 + (z_3 - z_u)^2]^{1/2} c t_u \quad (5)$$

$$\rho_2 = [(x_4 - x_u)^2 + (y_4 - y_u)^2 + (z_4 - z_u)^2]^{1/2} c t_u \quad (6)$$

These nonlinear equations may be solved by either closed-form methods, iterative techniques based on linearization, or by Kalman-filtering (estimation) algorithms.

Although GPS radiolocation is proven and works well, it requires multiple readings to obtain positioning accuracy down to the 10-meter range, which leads to greater complexity in the receiver and longer computation time to calculate a navigational "fix". Costly military receivers are not hampered by these limitations, but commercial receivers do not have the special encryption features required for rapid high-accuracy location determination, although recent advances in signal processing have somewhat improved the situation. In addition, GPS provides location information for receivers in the field which are typically attended by personnel. GPS does not readily adapt to situations where a central locating system is required for locating unattended assets or personnel that cannot respond by transmitting the GPS-determined location information to the central locating system via separate communication means. For these reasons, GPS is generally not suitable for radiolocation in a limited space at low cost for unattended assets. Furthermore, due to the extremely low signal strengths of the GPS satellite beacon transmitters at the GPS receiver, GPS signals are virtually always unusable indoors because of the additional attenuation of the overhead satellite signals by building roofs, upper-floors, and other overhead structures, as well as trees and dense foliage in general. In addition, in "urban canyons" and very rugged terrain, often there are too few GPS satellites in direct line-of-sight view of the receiver to obtain a sufficiently accurate position fix.

Further details of the GPS are provided in U.S. Pat. No. 4,894,662, to Counselman, "Method and System for Determining Position on a Moving Platform, Such as a Ship, Using Signals for GPS Satellites." Further details of the GPS are also provided in Kaplan[1].

One approach to a positioning system for radiolocation in a limited space is a system constructed by PinPoint Corporation and described in an article by Werb[2]. This article describes a local positioning system that subdivides the interior of a building into cell areas, and receives a 5.8-GHz tag response signal that is utilized to locate a tag attached to an object such as a medical records file. The tags are small and light for the widest applicability, inexpensive and therefore much simpler in design than GPS receivers. The system as a whole is purportedly capable of tracking thousands of tags to an accuracy of about 10 meters. Certain aspects of GPS have been employed in the PinPoint system. The PinPoint tags are designed to transmit a code for simultaneous arrival at three receivers installed in a facility. In this system, the tags do not include sophisticated circuitry and software for decoding a signal received from a satellite. Rather, the tags simply change a received signal from a transmitter located in the facility and transpond or repeat it back to a receiver with tag identification (ID) information phase-modulated onto it. The receiver extracts the tag ID from the return signal and determines the tag's distance from the antenna by measuring the round trip time of the signal's flight. Since the reader generates the signal, there is no need to calibrate a clock in the tag. Since the distance of each reader is determined independently, there is no need to synchronize clocks on various readers.

One particular drawback of the PinPoint system is that the tags, being predominantly passive transponders, only emit about one milliwatt of RF power, so that the tag can only be detected reliably up to a range of about 30 meters. This greatly limits the size of the area in which the system is operative, and requires a multiplicity of receivers if greater coverage is desired, thereby adding to the cost and complexity of the system. Furthermore, this system uses two discrete carriers in two different bands, one at ~2.45 GHz and one at ~5.8 GHz. This scheme thus requires two discrete RF systems, one for each band, which increases the likelihood of interference and requires the simultaneous use of (and "ties up") two unlicensed radio transmission bands in the local area. Furthermore, the relative complexity of the PinPoint tag is high, due to the requirement for RF hardware in two widely separated bands.

Although the PinPoint system may be suitable for certain limited applications such as asset location within buildings, there is still a need for a system that is operative over a larger area, e.g. industrial settings, forests, warehouses, staging areas, etc., but does not unduly multiply system complexity and expense in scaling up. One approach to extending the ranging capability beyond that of the PinPoint system is the hybrid-ranging system described by Dixon[3]. In this technique, a code sequence of a few thousand chips is further encoded with a digital "range message" whose bit rate is a multiple of the repetition rate of the code sequence which is transmitted as the ranging signal.

Stated in other words, the Dixon approach involves use of a phase-shift keying (PSK) modulated short polynomial code sequence and a superimposed frequency-shift keying (FSK) digital range message whose bit rate is the repetition rate of the polynomial sequence. In general, there is an ambiguity in range caused by using a polynomial code that is too short to handle the full desired distance range, but this is resolved in the Dixon approach by using the relatively slow digital pattern (whose length is such that its repetition period is longer than the promulgation of the delay of the longest range to be measured) to count basic-code repetitions during the two-way signal propagation interval. This system thus involves measuring the relative phase of the received range messages, which is augmented by counting the number of polynomial code repetitions (low-frequency bit alternations), which serve as range message markers. Although this technique is suitable for providing larger total range readings than with the polynomial code by itself, Dixon does not even suggest how to provide any finer measurement resolution.

Accordingly, there is still a need for a radiolocation system that is operative in a larger area than that of a passive tag transponder system and utilizes spread-spectrum signals for security and minimal interference, but is still capable of providing sufficiently accurate ranging at low cost. There is also still a need for a more limited-scale radiolocation system for applications where the expense and complexity of GPS cannot be justified, or where or the technical limitations of GPS are a problem, such as in forest areas, cities with tall buildings, industrial settings, underground, and the like. There is also a need for a low-cost radiolocation system that provides sufficient gross ranging, with unambiguous intermediate and fine ranging resolution capability for greater accuracy when required, which will operate in the relatively stringent bandwidth allocations permitted by law. Finally, there is also a need for a radiolocation system where tags for unattended assets can be manufactured with as many components as possible on a single integrated-circuit (IC) chip, for low cost, small size, low power, high reliability, and good repeatability.

SUMMARY OF THE INVENTION

It is an object of the invention to provide accurate positioning information for an RF tag or other device in indoor, underground, or other constrained environments. It is another object of the invention to provide high immunity to multipath propagation effects and other forms of RF noise and interference. It is another object of the invention to provide high positioning accuracy utilizing substantially less RF transmission bandwidth than conventional spread-spectrum ranging techniques achieving similar positioning resolution. It is another object of the invention to alternatively provide high positioning accuracy with substantially shorter measuring times than conventional spread-spectrum ranging techniques achieving similar positioning resolution. It is a further object of the invention to permit radiolocation functions to occur concurrently with, and transparently to, the robust transmission of digital device or tag data over the same spread-spectrum RF link.

One embodiment of the invention is based on a method of determining a location of a tag, comprising: developing a coarse ranging of the location of the tag by determining a phase of a spread-spectrum code sequence that is transmitted by the tag to the plurality of receivers by modulating a carrier with a spread-spectrum code; developing an intermediate ranging of the location of the tag by determining a phase of a difference signal that is transmitted by the tag to the plurality of receivers; utilizing the coarse ranging and the intermediate ranging of the location of the tag to determine a set of distances from the tag to each of the plurality of receivers; and utilizing the set of distances to triangulate a position of the tag. Another embodiment of the invention is based on an apparatus, comprising: a tag including a spread spectrum transmitter; and a plurality of receivers including circuitry to develop a coarse-resolution range value of the location of the tag by determining a phase of a spread spectrum code sequence transmitted by the tag to a plurality of receivers; circuitry to develop an intermediate-resolution range value of the location of the tag by determining a phase of a difference signal that is transmitted by the tag to the plurality of receivers; resources utilizing the coarse-resolution and intermediate-resolution range values of the location of the tag to determine a set of distances from the tag to each of the plurality of receivers; and resources utilizing the set of distances to triangulate a position of the tag. Another embodiment of the invention is based on an apparatus for determining a location of a tag, comprising: circuitry to develop a coarse-resolution range value of the location of the tag by determining a phase of a spread spectrum code sequence transmitted by the tag to a plurality of receivers; circuitry to develop an intermediate-resolution range value of the location of the tag by determining a phase of a difference signal that is transmitted by the tag to the plurality of receivers; resources utilizing the coarse-resolution and intermediate-resolution range values of the location of the tag to determine a set of distances from the tag to each of the plurality of receivers; and resources utilizing the set of distances to triangulate a position of the tag.

These, and other, aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification, wherein like reference numerals (if they occur in more than one view) designate the same elements. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known components and processing techniques are generally omitted so as not to unnecessarily obscure the invention in detail.

Within this application several publications are referenced by superscripts composed of Arabic numerals within parentheses. Full citations for these publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. Patents disclose embodiments that were satisfactory for the purposes for which they are intended. The entire contents of U.S. Pat. Nos. 4,665,404; 4,894,662; 5,056,106; 5,119,104; 5,216,429; 5,422,908; 5,437,055; 5,495,499; 5,552,772; 5,608,712; 5,517,406; 5,828,693; and 5,917,449 are hereby expressly incorporated by reference herein for all purposes.

Figure 9:
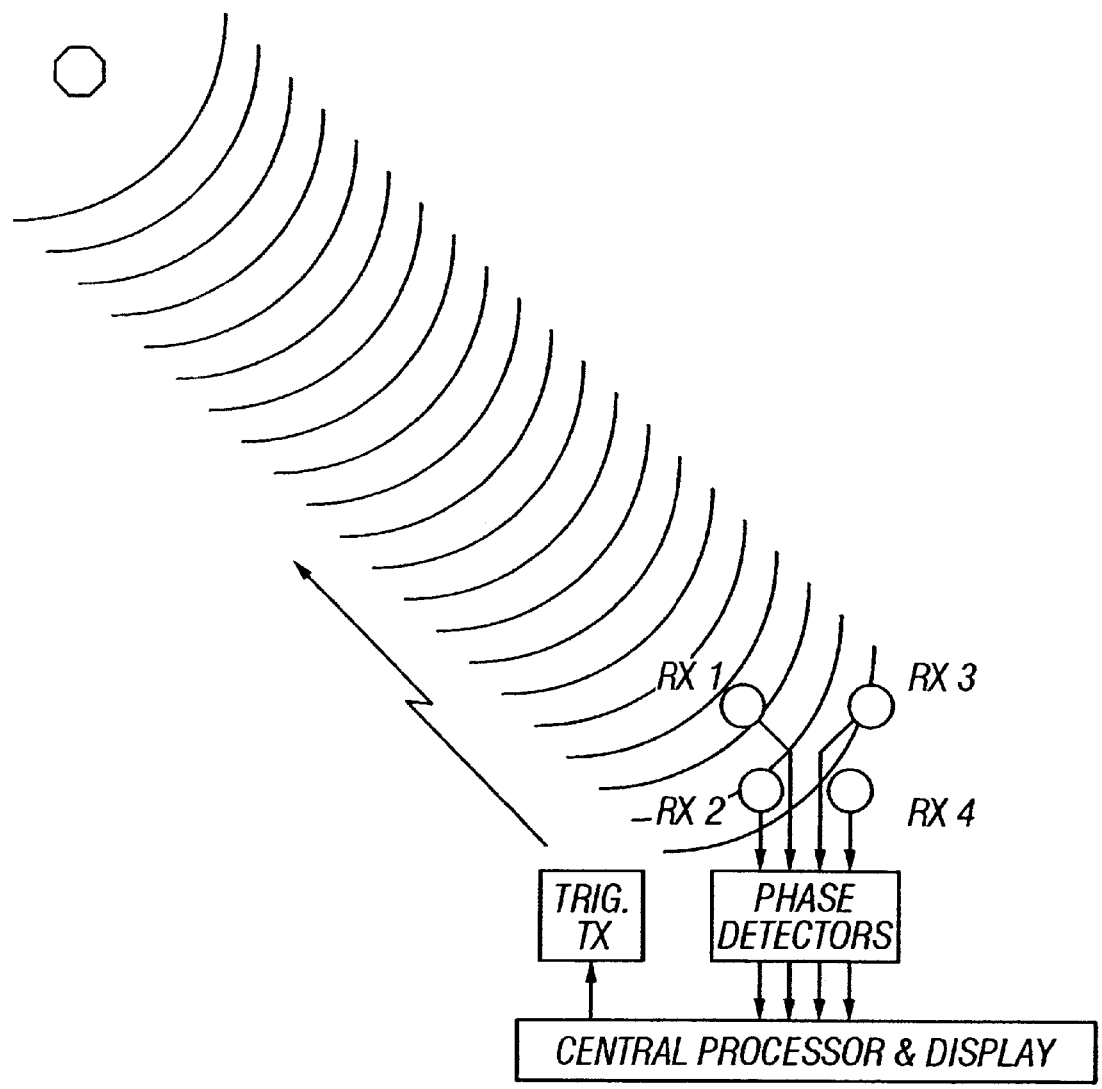
FIG. 9 provides a diagram of a second type of system embodiment in which a single unit receiving platform with a close-spaced antenna array can be utilized with the transceiving tag of the invention.

Stated generally, a preferred embodiment of the invention comprises one or more tag modules, a set (typically four) of area receiver/interrogator units, a central processor or computer to perform the location calculations, and interconnecting cable, fiber, or RF links between said receivers and the central processor. Each receiver/interrogator unit includes: a wideband RF front-end amplifier subsystem; one or more direct-sequence spread-spectrum correlators; timing and control circuitry; and a remotely controlled interrogator transmitter which sends a targeted command via a separate (or time-shared) channel to the tag(s) being tracked. Although the more common setup involves the 4 receivers located at the corners of a typically rectangular area to be monitored, the receivers may also be configured in a closely spaced array, as shown in FIG. 9, which permits a very compact implementation of the system. This alternate embodiment of the invention provides a compact, easily deployed single-assembly implementation for the system master receiver. This approach utilizes a vectorized radiolocation technique which has significantly simpler system setup requirements. Such a scheme is ideal for temporary, emergency, or very low-cost system deployments.

Referring again to FIG. 1, the central processing unit, which would typically be housed in a laptop personal computer (PC), would input data from the 4 receivers and process the timing information from the 4 spread-spectrum signals and perform the standard triangulation calculations. Additional correction algorithms to handle noise, multipath, and the unique range-resolution enhancements due to the invention are fully integrated into the location software for maximum ease of use. Concurrently, database software in the PC will also archive both position and tag data (including both identification and sensor data if required) and could additionally be used in specific applications to monitor motion of tagged items. Alarms, visual displays, and other useful human-interface features will also be available via software drivers.

Referring now to the drawings, in which like numerals indicate like elements and components throughout the several drawing figures, a system 10 according to a preferred embodiment of the invention is shown for determining the position of a tag 12 which transmits signals to a plurality of receivers 15a, 15b, 15c, 15d, identified as receiver 1, receiver 2, receiver 3, and receiver 4. The receivers 15 are communicatively coupled to a controller 18 via cables 14. The tag 12 is associated with an item 19, such as a pallet of goods. The item 19 can be-anything, e.g. a vehicle, a container, a person, a piece of equipment, or the like.

Figure 1:
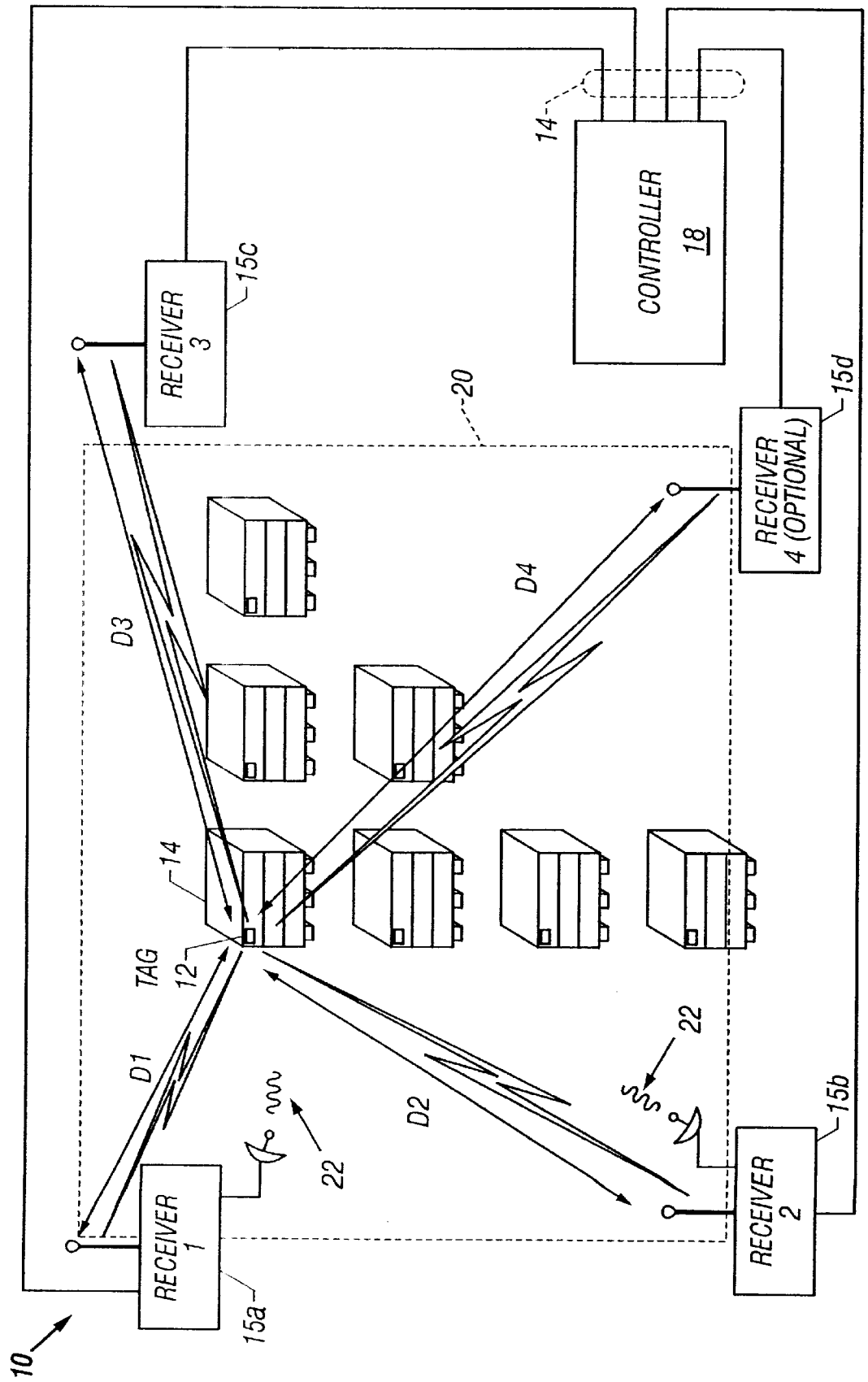
FIG. 1 illustrates a system according to the invention for determining the position of an item using signals transmitted from a tag associated with the item.

The tag 12 will be determined to be a predetermined distance D from a receiver, e.g. in FIG. 1 the tag is distance D1 from receiver 1, distance D2 from receiver 2, etc. Since the distances and angles between receiver 1 and receiver 2 are predetermined, the tag can be located relative to receiver 1 and receiver 2 by triangulation. Adding a third receiver 3 allows elimination of positional ambiguity in two dimensions, and the fourth (optional) receiver 4, which may be placed at a different elevation, can further provide full, unambiguous elevational position measurement.

In accordance with a preferred embodiment of the short-range radiolocation system, a minimum of three receivers 15 will be deployed, and preferably at least a fourth receiver is provided so as to determine elevation data. The receivers 15 are preferably deployed such that they are positioned about the periphery of an area 20 within which the item, or a plurality of items, is to be located. The receiver deployment therefore defines the area 20. The area 20 is relatively small when compared to the coverage (global) of the known GPS system. The invention is particularly suitable for deployment in various industrial, military, transportation, and emergency-assistance applications.

In particular, a plurality of items 19 such as physical assets or personnel are each provided with the tag 12. Each tag 12 transmits signals identifying itself and the particular asset associated with the tag. The system 10 then is operative to identify the particular tag by virtue of characteristics of the transmitted signal, as well as determine the location of the tag relative to the receivers defining the area 20.

Preferably, each of the tags 12 is a small battery-powered device operative to transmit a predetermined signal comprising (a) identification information (ID) in a data stream, plus (b) a standard known spreading-code sequence. The tag's signal is simultaneously received by the diversely located range-finding receivers employed throughout the area 20. The relative code phases of the spread-spectrum signals are received and confirmed in the various receivers, and the effective delays (and, thus, ranges) calculated. From a priori knowledge of the locations of the receivers 15, the position of the selected tag and its associated asset may be calculated by standard triangulation algorithms.

In accordance with one embodiment of the invention, the tag 12 transmits its signals in response to a stimulus or trigger signal, to conserve battery power and minimize interference. In accordance with another embodiment, the tag 12 transmits its signals periodically, or randomly, without a stimulus.

Still referring to FIG. 1, each receiver 15 is operative to (a) transmit an interrogation signal 22 within the area 20 and (b) receive a transmitted burst signal or "chirp" back from a particular interrogated tag that responds to the interrogation signal, for purposes of determining the location of the particular identified tag 12. Each tag 12 contains predetermined identifying information suitable for determining the identity of the particular asset associated with the tag. Upon receipt of an interrogation signal 22 transmitted by the receivers 15 or alternatively transmitted by the controller 18, only a tag that receives its particular interrogation signal responds by transmitting its distinctive spread-spectrum signal code. This allows a plurality of tags to co-exist within the area being monitored and to minimize interference between tags.

Furthermore, only having a tag respond to an interrogation conserves battery power for each tag, which is completely self-contained and miniature. This is in contrast to techniques of the GPS, where a plurality of transmitters while orbiting the earth are continuously transmitting, and the user receivers passively receive the information from the satellites for determining position. Using such an approach similar to GPS, each tag or device being located would be required to contain much more complicated computational capabilities for determining position as well as a suitable high-powered transmitter designed to be effective to transmit the calculated location information to a central controller.

In the invention, each of the tags is preferably small, completely self-contained, and battery-powered, and needs only to transmit information identifying the particular tag and the spread-spectrum code at the appropriate frequency. The receivers receive the signal from the tag that is identifying itself and provides appropriate signals to the controller for determining the position of the tag whose identity and location is being sought.

Figure 2A:
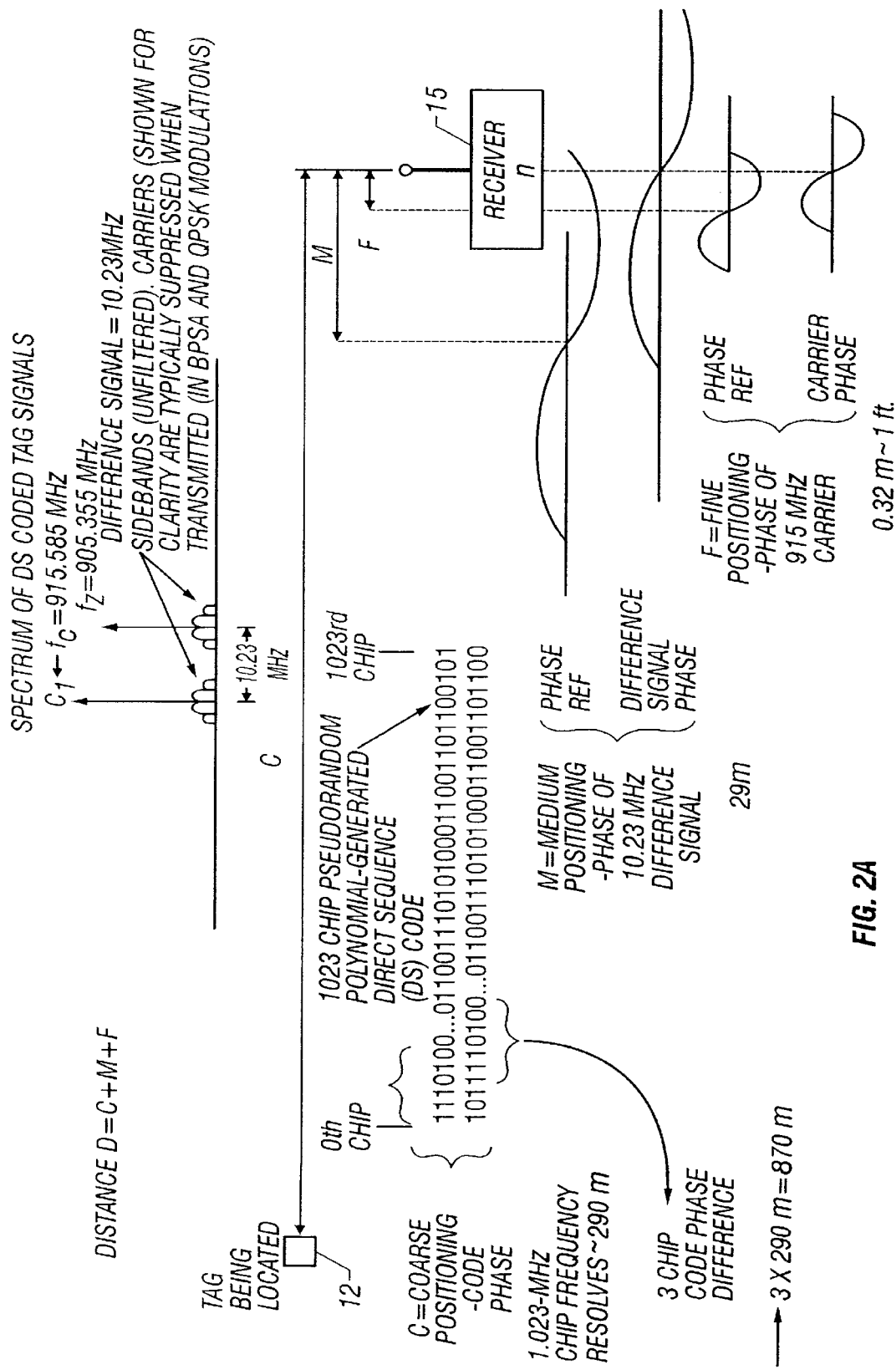
FIG. 2A graphically illustrates an exemplary spread-spectrum signal transmitted by a tag being located in accordance with a preferred embodiment of the invention and the three principal positioning-signal components and associated methods.
Figures 1, 2B:
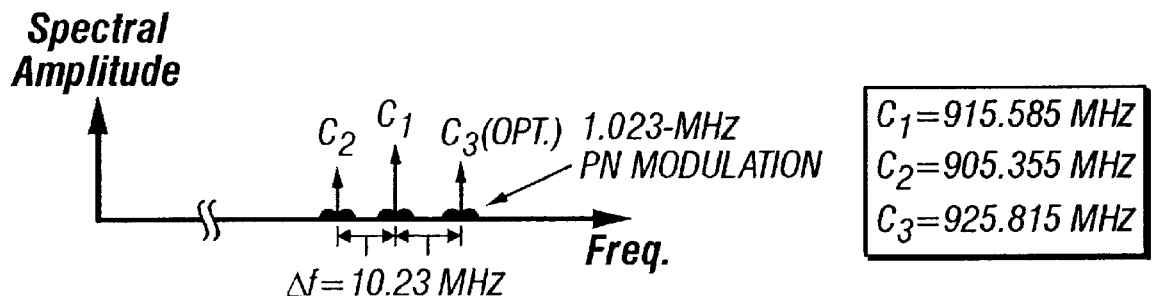
FIG. 2B graphically illustrates an exemplary spread-spectrum signal in accordance with an alternative embodiment of the invention.
Figures 2, 2B:
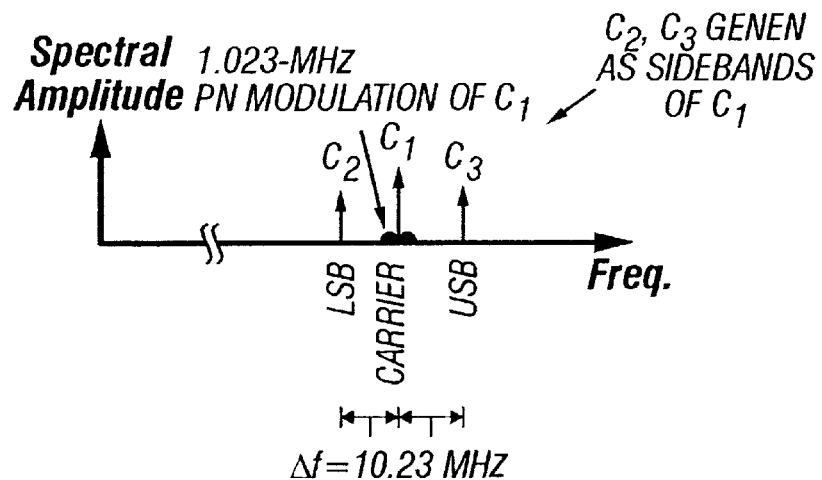

Refer next to the subparts of FIG. 2 for a description of the structure of the signals of a preferred short-range radiolocation system 10. Preferably, each tag 12 transmits a specially configured signal, which permits recovery in the receiver of three distinct parts or components: (a) a pseudorandom spread-spectrum coarse positioning signal "C" derived from a direct-sequence (DS) polynomial pseudorandom noise (PN) generator, (b) an intermediate or medium positioning signal "M" based on a second carrier frequency (separated from the first by a predetermined difference frequency) modulated with the same (or a similar) spread-spectrum code, and (c) a fine positioning component "F" determined by the phase of the carrier signal(s) transmitted by the tag. The algorithmic combination of the components C, M, and F allows a determination of the distance D from the tag to a receiver.

The signals of primary interest in determining position are transmitted by the tag 12 in a particular frequency band selected for adequate transmission characteristics in the environment of the system. A preferred embodiment makes use of one of the unlicensed industrial/scientific/medical bands (ISM) allocated by the Federal Communications Commission (FCC) in the United States for spread-spectrum modulation, which offers an improvement in signal robustness and a concurrent reduction of potential interference to other users and services.

A preferred embodiment transmits signals in the 902–928 MHz ISM band, recently allocated by the FCC for unlicensed low-power devices utilizing spread-spectrum transmissions. Alternatively, the ISM band at 2.450–2.4835 GHz may be utilized, but this is the same band used by commercial microwave ovens, which can (and do) cause significant interference. Also, the 5.800–5.825 GHz ISM band may be employed, but the complexity and cost of circuitry in these higher frequency regions is presently too high for many applications. However, technological advances such as the use of silicon-germanium (SiGe) may well soon change this situation. In any event, those skilled in the art will be able to select a frequency band suitable for use in a given application.

In order to determine the distance of a tag 12 being located and one of the receivers 15, a distance calculation D is determined as the combination of the coarse positioning component C, plus the intermediate or medium positioning component M, plus the fine positioning component F.

The coarse-positioning component C is determined by the phase of a predetermined spread-spectrum code sequence. Preferably, a direct-sequence (DS) code with well defined cross-correlation characteristics, such as a "Gold" or "Kasami" code (so-named after their inventors) or concatenated codes generated by combinations of shorter maximal linear codes (for example, one of the well known "JPL" ranging codes from NASA's Jet Propulsion Lab) is used to facilitate rapid synchronization of the receiver. Preferably, averaging techniques are also employed to improve the signal-to-noise (S/N) ratio and overall phase accuracy. In addition, multi-cycle FSK-modulated range-counting messages can be impressed on the phase-modulated DS code modulation to increase the total maximum measurement range, along the lines of the techniques discussed in Dixon [3]. Here, the range-message data simply counts the PN code-sequence cycles ("epochs") to increase the total accumulated time-off-light measurement capability of the system; this is principally of use in larger, outdoor scenarios for special-purpose applications.

In addition, system-based data selection algorithms are generally employed to enhance multipath rejection by comparing the four or more receiver code-phase readings, rejecting inconsistent receiver range data and flagging the controller when one receiver is consistently in error. Additionally, in higher-performance configurations, the system can also alter its center RF carrier frequency to shift out of deep multipath-induced nulls, which are almost always sharply frequency-dependent in nature.

Coding of the tag signals is required to provide the desired range resolution with spread-spectrum bandwidths that are reasonable for practical and low cost implementation in a tag. For example, consider a system in which a resolution of one foot is desired in the location vectors. This degree of accuracy implies a nominal data spreading ("chipping") rate of approximately 1 GHz. This obviously cannot be achieved in the 26-MHz total bandwidth contained in the RF communication band (902–928 MHz) within which the system is preferably to operate. Accordingly, the signaling scheme must be modified so as to obtain a desired resolution of accuracy while still maintaining a reasonable (and legally permissible) spreading bandwidth for the frequency band of interest. Theoretically, even with maximum performance systems capable of-resolution to $\frac{1}{1000}$th of a chip (only possible with no multipath at all), this would indicate a spreading rate of at least 1 Mchip/sec under perfectly (and unrealistically) ideal propagation conditions (and with very long averaging times). More practically at least 10 Mchips/sec is required for localized terrestrial and indoor-type scenarios, and that with significant amounts of averaging and anti-multipath processing of some effectiveness.

As those skilled in the art will understand, a straightforward determination of code phase is used in GPS and similar radiolocation systems. However, an excessive spreading-code rate (as compared with the bandwidth allocated for operation of a preferred system) is required to provide useful degrees of positional accuracy, for example, to the desired degree of about one foot or 0.3 meters. For example, a 1.023-MHz code chip rate, which is configured to cycle through a complete code-sequence (epoch) of 1023 chips in one millisecond, permits a measurement accuracy of $3 \times 10^8$ m/s÷$1.023 \times 10^6 \approx 2.93 \times 10^2$ m=293 meters/chip, which in general is too large to permit accurate location of small items such as personnel or equipment in a staging area, warehouse, or the like (although perhaps adequate for determining the location of a large ship in the middle of the ocean).

Although it is known from GPS technology that multiple-sample averaging can be used to provide lower errors, and thereby can provide positioning accuracy to roughly within six meters, this requires much more complexity in the receiver and significant additional time for acquiring and processing the multiple sample averages.

Accordingly, in a preferred embodiment the basic 1.023-MHz chipping frequency of a spread-spectrum code sequence is employed to provide for a coarse-positioning (C) measurement, which allows resolution of the position of a tag being located relative to a receiver of about ±293 meters per chip (within ±1 chip). Assuming that the synchronizing precision of a moderate-quality ranging receiver will permit locking within ±0.1 chip (a somewhat conservative figure but realistic for multipath-prone environments), then the tag can theoretically be located to within approximately ±29 meters.

Additional techniques are provided to achieve the desired precision in the location of the tag in the form of a medium- or intermediate-positioning (M) and a fine-positioning (F) technique. Preferably, the intermediate-positioning (M) component is provided by measuring the RF phase of a predetermined difference signal that is imposed upon a primary carrier, while the fine-positioning (F) part is determined by measuring the RF phase shift of the carrier-frequency signal itself relative to a phase-reference signal available to the measurement system. It is key to the proper functioning of the invention that the transmitters employed (typically residing in the tag units) possess a fully synchronous architecture, i.e., with all pertinent oscillator and clock frequencies locked in frequency and phase to provide the receivers with phase coherence-among the multiple RF and code signal components. This mutual coherence forms the basis for the correct concatenation of these components to achieve the desired positioning accuracies with reasonably low-cost and low-power hardware devices. This time-coherency is further exploited to provide redundant signal-timing functions in the receivers to overcome typical signal degradations and phase jitter caused by multipath propagation of the tag signals in the application environment, as shown for example in the receiver-system implementation of FIG. 6. The interrelation of the several signals of the invention also facilitates the use of novel receiver circuitry to reduce overall complexity and yet provide very high levels of signal-tracking performance, even in difficult (e.g., reflective) RF environments.

As mentioned, a preferred carrier frequency for the system constructed as described herein is somewhere in the U.S.-sanctioned 902–928 MHz ISM band, for example, around the band center at 915 MHz. If the precise desired primary frequency is 915.585 MHz, to be produced by a standard 10.23-MHz frequency synthesizer, this can be achieved as a multiple of exactly 179×10.23 MHz, then divided by 2. The 10.23-MHz clock is also used to derive a 1.023-MHz chipping clock for the direct-sequence polynomial (PN) generator through a factor-of-10 divider. This 915.585 MHz signal, along with a secondary or auxiliary signal, often at somewhat lower power and offset by the selected difference frequency (nominally 10.23 MHz) at either 905.355 or 925.815 MHz, is transmitted by the tag 12 to the receivers, preferably by a spread-spectrum modulated signal format for improved multipath and RF interference immunity.

The fine-positioning spatial resolution (F) is obtained by measuring the average carrier phase (after filtering and/or despreading), for determining position within approximately one wavelength of the RF carrier frequency (without averaging):

$$F = 3 \times 10^8 \div 915 \times 10^6 \cong 0.0032 \times 10^2 \text{ or } 0.32 \text{ m}$$

which is approximately one foot. Typical field measurements can easily be made (in the presence of only moderate multipath) to better than ±¼ wavelength, or about ±7.5 cm.

As described, the initial coarse-positioning ranging calculation is performed using the DS code phase, and a much smaller increment of distance is determined by the phase shift of the 915 MHz carrier frequency. However, since a single cycle at 915 MHz represents only about 0.327 meters (~1 foot), the carrier phase information alone cannot unambiguously supply the needed additional locational information to bridge the gap between the coarse-positioning accuracy of about ±29 meters and the total fine-positioning range of approximately ±0.15 meters.

Referring to FIG. 2A, the intermediate- or medium-positioning information is provided by measuring the phase difference of a difference signal that is either modulated onto the primary carrier frequency $C_1$, or provided by a second carrier separated by an appropriate span from $C_1$. Preferably, a 10.23-MHz difference signal is employed for medium-scale ranging. A signal at this frequency allows unambiguous positional resolution of within one wavelength (again, without averaging):

$$\lambda M = 3 \times 10^8 \text{ m/s} 10.23 \times 10^6 \cong 29 \text{ m}$$

Of course, averaging of the 10.23-MHz component phase reading would improve the relative measurement accuracy. For example, with 100 averages and typical Gaussian noise statistics, the accuracy would improve by the square-root of 100, or a factor of ten. For 10,000 averages, achievable within a usefully short 100-ms interval, the improvement factor would be 100-fold. If we assume that the real-time phase measurement can be made to within ~±6 degrees, then the nominal (100-sample) averaged measurement uncertainty would be on the order of ±0.6 degrees, or about ±5 cm; the heavily averaged reading would ideally then be about an order of magnitude better. It should be noted that although multipath can markedly degrade the accuracy of RF-signal phase measurements, the 10.23-MHz component is preferably (and typically) derived in the receiver from the two transmitted spread-spectrum-modulated carrier signals at 915.585 and 905.355 (or, alternatively, 925.815) MHz. Each of these carriers is direct-sequence spread-spectrum modulated with the basic 1.023-MHz chipping code (of length 1023) and via receiver signal processing can reject the vast majority of multipath-induced degradations such as phase jitter. The receiver, through a conventional Costas-loop arrangement, recovers the original RF carrier phase and simultaneously demodulates the chipping-data stream(s), one for BPSK modulation or two in the case of quadrature (QPSK) modulation. This general receiver architecture, although not required to implement the invention, has the distinct advantage of demodulating multiple popular modulation formats (i.e., FSK, MSK, BPSK, QPSK, and offset QPSK (OQPSK) as well as facilitating the comparison of RF-carrier and spread-spectrum code phases needed to most efficiently implement the instant invention.

As shown in the comparative spectral diagrams of FIG. 2B, one alternative method for generating the medium-range measurement involves transmitting an additional frequency or carrier $C_2$ separated from the primary carrier frequency $C_1$ by a predetermined amount, e.g. precisely 10.23 MHz or some other suitable difference signal frequency (left-hand plot). The two signals can subsequently be combined by heterodyning or mixing in the receiver to reproduce the difference frequency signal of 10.23 MHz. This mixing process can be accomplished by conventional balanced mixers, which produce an output signal consisting of sum and difference frequencies. The sum at ~1.83 GHz is filtered out, leaving the desired 10.23-MHz difference component. An alternative scheme (right-hand plot) adds 10.23-MHz spaced sidebands (at $C_2$ and $C_3$) onto the main carrier at frequency $C_1$ via amplitude, frequency, or phase modulation; a single sideband component could also be employed if desired, with much the same receiver processing as in the double-sideband case. It is important to note that in all these spectral plots, although the carriers have been marked by prominent spectral impulse-functions (the vertical arrows), in many practical DS systems the steady-state carrier components are actually suppressed by the action of the balanced modulators used in both amplitude- and phase-modulated implementations and are actually not transmitted over the RF channel. The "missing" carriers are then regenerated in the receivers via coherent or "synchronous" demodulation techniques, such as the Costas or other types of phase-locked loop (PLL) circuitry.

Utilizing either a preferred or the alternative technique of obtaining medium-resolution positioning data, the phase of the difference signal is compared to that of an internal receiver reference source to fill in the missing information between the coarse positioning and the fine positioning measurements. As will be understood by those skilled in the art the 10.23-MHz difference signal figure corresponds to approximate range of 29.3 meters as follows:

$$\lambda = c/f = 3 \times 10^8 \div 10.23 \times 10^6 \approx 0.0029 \times 10^2 \text{ m} \approx 29 \text{ m}$$

where $\lambda$ is the equivalent difference-frequency wavelength and c is the speed of light.

According to another aspect of the invention, and as shown in FIG. 2B, a third carrier $C_3$ could be added, preferably spaced apart from the main carrier $C_1$ by the same difference of 10.23 MHz, but on the opposite side of the center signal from the second carrier $C_2$. Such an approach is useful for combatting possible multipath induced nulls in the field at the key frequencies in the 915-MHz band. All three carriers may be DS spread-spectrum modulated to improve the resistance of the system to multipath and other forms of interference. In addition, the use of offset QPSK (OQPSK) modulation on one or both of the secondary carrier(s) can provide an effectively doubled time resolution using a modified quadrature (Costas-type) phase detector in the receiver; since the modulation in the quadrature (Q) channel is delayed by one-half chip period from the in-phase (I) channel chip stream, the effective recovered chip-clock interval is reduced to ½ that of the non-offset case, thereby essentially doubling the positioning accuracy for this component of the system.

Depending on the exact carrier frequencies, chipping rates of the direct-sequence spreading, and averaging algorithms employed, the difference-frequency aspect of the invention may be varied to meet system operational requirements. The difference-frequency aspect of the invention may even be varied adaptively (e.g., as a function of state variables, optionally with artificial intelligence). For instance, it may be required that in a given application the radiolocation system be interoperated with other ISM-band RF systems, spread or not, and the RF spectra must therefore be tailored to avoid specific blocks of frequencies within the band to prevent interference. The exact frequencies of the carriers, PN code rates, and difference-frequency figures (e.g., 10.23 MHz) will in general need to be set according to external constraints and yet still provide accurate tag positioning information concurrent with low power consumption and acceptably short averaging times to suit the immediate use. Obviously, the PN code types, rates, lengths, and averaging statistics can all be adjusted to meet the concurrent requirements of system functionality, size of the covered area, available bandwidth, severity of multipath, RF interference levels, data security, and data reliability as well.

The foregoing described methods and spectrum utilization and allocation can be employed in the context of standard RF-based location schemes based fundamentally on the notion of triangulation of position in either two or three dimensions. Those skilled in the art will of course appreciate that continuous calculations at predetermined short intervals can be useful for tracking trajectories and velocities of mobile assets or people.

Figure 2C:
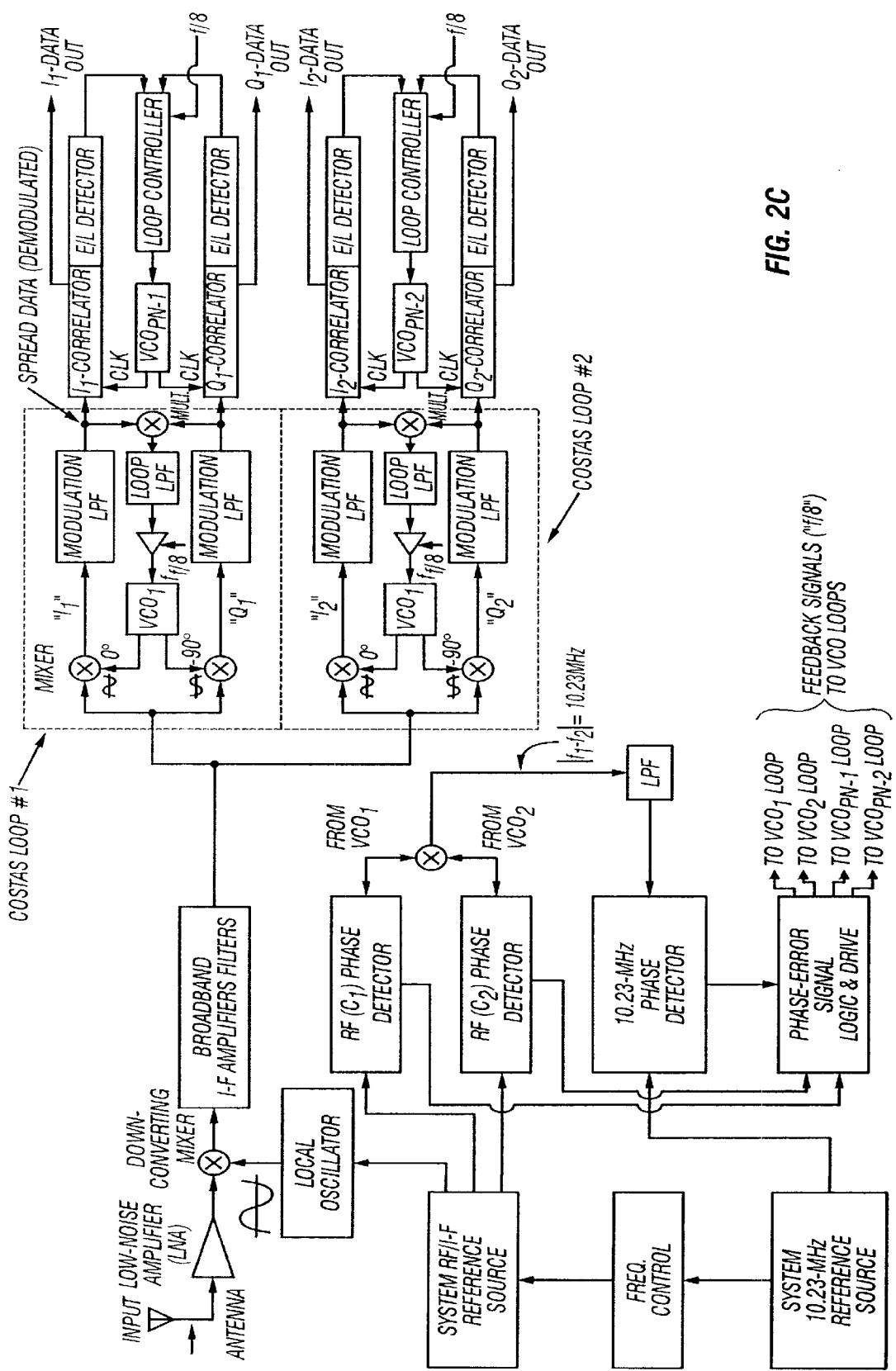
FIG. 2C graphically illustrates an exemplary spread-spectrum signal in accordance with yet another alternative embodiment of the invention, utilizing three carrier signals.

To combine the respective three signal components according to the invention a preferred-embodiment receiver architecture is shown in FIG. 2C. This arrangement provides a minimal-complexity but high-performance synchronous multicomponent phase-measurement scheme which facilitates the coherent concatenation or "nesting" of the 3 distinct phase-detector feedback loops. Each loop is based on the well known Costas quadrature phase-detector configuration, which is often employed for spread-spectrum synchronization loops in existing-art systems. Referring to the diagram of FIG. 2C, the typical radiolocation-system receiver blocks are best described by following the RF input signal through the antenna at left. The input is amplified in the LNA and downconverted to the intermediate frequency (IF) for filtering and high-gain amplification. The output of the IF chain is fed to two Costas-loop demodulator blocks, one for the $C_1$ signal and the other for $C_2$. Next, the Costas circuits separate and coherently demodulate the quadrature I and Q components [according to the standard terminology], which in this case represent the respective I- and Q-channel chipping streams. (In the case of BPSK modulated signals, part of the Costas circuitry can be eliminated but the more general case is illustrated here). The output of each Costas block is then sent (at right) to parallel DS correlator blocks, which despread the chipped sequences and produce the respective output data streams (at far right). The bulk of the position-measurement (phase-comparison) processing task for each receiver is handled in the blocks in the lower-left portion of the drawing. System reference signals for both the master frequency (here, 10.23 MHz) and the RF and IF oscillators (again, all commonly frequency and phase-locked to the system master clock) are sent to a group of phase detectors which measure the respective phase differences between the various carrier and develop a set of error voltages to be returned to the several VCO control loops. In essence, each loop is "centered" in its range by the error signals from the higher-resolution loops nested with it, such that the loops cooperatively lock and maintain a mutual feedback correction function to accomplish the tag-distance measurement task.

Figure 3:
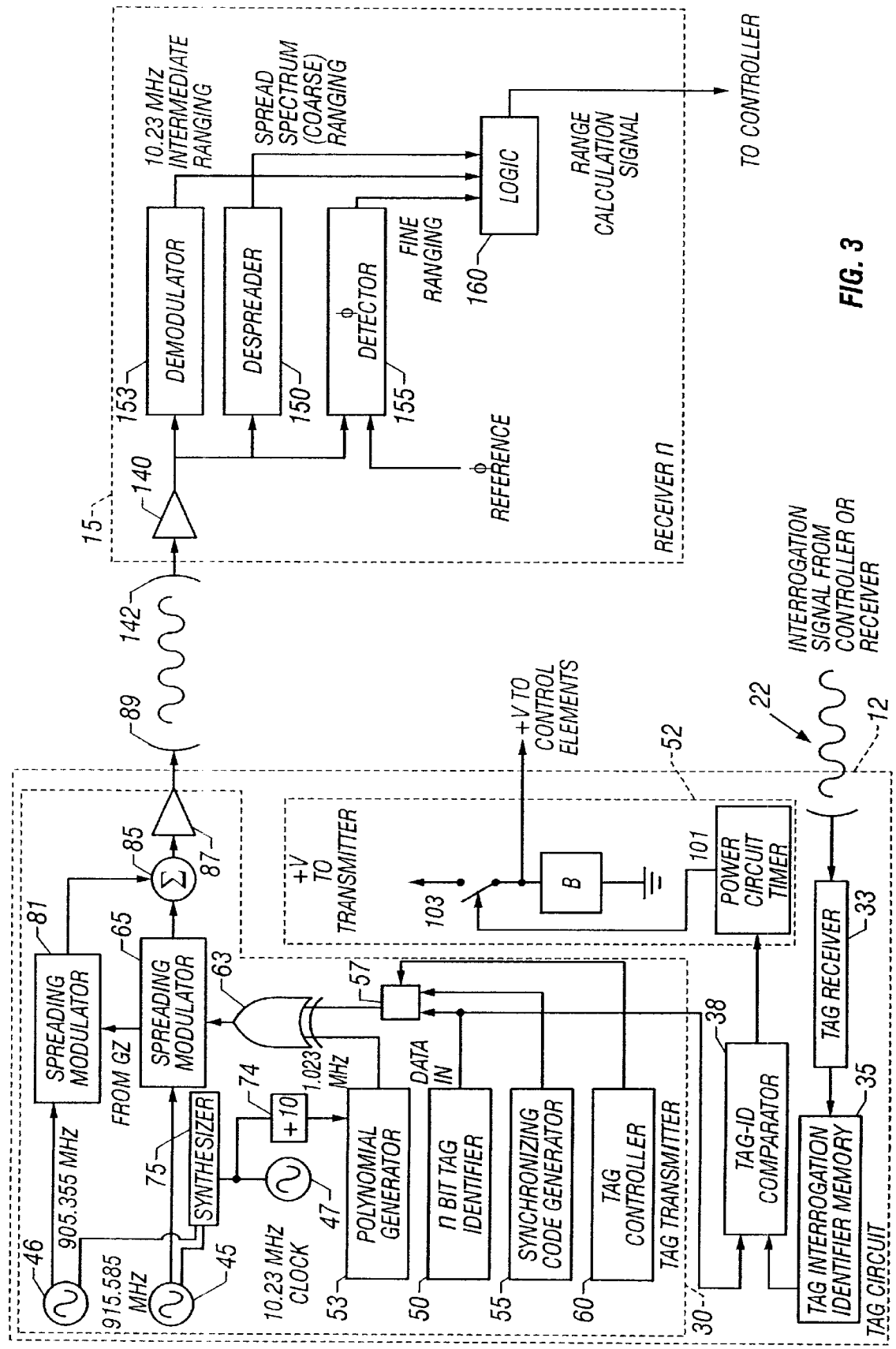
FIG. 3 is a block diagram of a tag circuit and a receiver constructed for use in the system shown in FIG. 1.

Refer now to FIG. 3 for description of the preferred tag 12 and preferred receiver 15 constructed in accordance with a preferred embodiment of the invention. Each of the plurality of tags 12 and each of the plurality of receivers 15 is constructed as shown in FIG. 3, with certain variations and alternatives as will be described.

Each tag 12 comprises a tag transmitter 30, a tag receiver 33, a tag interrogation identifier memory 35, a comparator 38, a power circuit 41, and a tag controller 60. These components allow a tag to be specified with a particular identity associated with particular personnel or asset, to respond to an interrogation, and to trigger the tag transmitter associated with the tag to chirp out its spread-spectrum signal only when that particular tag has been interrogated.

Preferably, all of the components of tag transmitter 30, tag receiver 33, tag interrogation identifier memory 35, tag comparator 38, power circuit 41, and controller 60 are integrated into a single small device approximately the size of a credit card, and provided with battery power.

The tag's transmitter circuit 30 includes components for generating the direct-sequence (DS) ranging code, a 905.355 MHz oscillator 45 for generating the primary carrier signal, and a 10.23-MHz clock 47 for generating the difference signal and for clocking the logic. An n-bit tag identifier memory 50 is provided for storing identifying information that allows the particular tag be identified upon receipt of its transmitted signals by the receivers and controller. Preferably, the tag identifier is a 32- or 64-bit word stored in nonvolatile memory so that the tag's identity can be easily changed if required. Typically, a simple serial interface (not shown) is used to load the memory; this is an extremely common feature and will not be belabored here.

Alternatively, the tag identifier memory 50 can be constructed from read-only memory (ROM), with each tag being provided with a unique fixed identifier that cannot be changed. In a system utilizing a fixed identifier, the controller 18 maintains a database or table in memory that associates a particular tag and its unique fixed identifier with information about the particular item (e.g. person or asset)

carrying the tag. A system constructed in this manner has the advantage that the association between a tag and a particular item can be changed centrally at the controller. In contrast, a system utilizing tags that have a changeable identifier is more adaptable to making changes and updates to associate tags and items in the field, which is advantageous in applications where central maintenance of tag and item identity is less desirable.

The tag 12 includes a polynomial (PN) generator 53 for generating the direct-sequence (DS) code that is used to spread the spectrum of the transmitted signal. Preferably; the polynomial generator is operative to generate a maximal code sequence whose properties are well known and include characteristics including that (a) the number of 1's in a sequence equals the number of 0's within one chip, (b) the statistical distribution of 1's and 0's is well defined and always the same, and (c) the autocorrelation of a maximal code is −1. Those skilled in the art will appreciate that the almost equal number of 1's and 0's in any maximal linear code allows the average, (DC) signal component to be essentially zero, and thus simplify design of the corresponding signal-processing hardware. The excellent text by Dixon[3] provides a detailed discussion of PN sequences, their characteristics, and their generation, which is also well known generally in the spread-spectrum field.

As those skilled in the art will understand, the notion of autocorrelation refers to the degree of correspondence between a code and a phase-shifted replica of itself. Preferably, a maximal, Gold, or Kasami code provides a very distinct autocorrelation function that allows receivers to discriminate between signals on a yes-no basis. With a minimal number of autocorrelation values, receivers can minimize false synchronization as a result of intermediate cross-correlation values. The effect of cross-correlation of two codes from different tags, where the same maximal code sequence is employed in each tag, is minimized in the invention in embodiments where a tag only transmits in response to an interrogation.

Still referring to FIG. 3, a synchronizing code generator 55 is provided in the tag 12 for generating a predetermined readily identified synchronizing code, such as an alternating pattern of 1's and 0's, to allow the receivers to quickly lock onto a signal transmitted by a tag. After synchronization has been achieved, the identifying information from the tag identifier memory 50 is transmitted as a data signal that allows identification of the particular tag.

A switch 57 is employed to switch between the synchronizing code generated by the synchronizing code generator 55 and the tag identifier provided by the tag identifier memory 50, in response to a switching signal provided by the tag controller 60. The tag controller 60 can include an embedded microcontroller that is operative to switch between the synchronizing code and the ID. Alternatively, the sync code can be modulated via a different, easily recognizable format to facilitate separation of sync and data. In any event, such processing is commonly accomplished in the art and will not be further discussed; the text by Dixon[3] provides excellent coverage on this subject.

Alternatively, the signal for switching between the synchronizing code generator 55 and the tag identifier memory 50 can be made a function of elapsed time, which time can be empirically determined by testing in the field to establish the minimum required time for allowing receiver synchronization reliably.

The signal from the switch 57, either synchronizing code or tag identifier, is connected to an exclusive OR-gate 63 to combine the synchronizing code or the tag identifier, as selected, with the direct-sequence code from the polynomial generator 53. The signal from exclusive OR-gate 63 is then provided to a spreading-signal modulator circuit 65, which is in actuality a standard RF data modulator, either a simple balanced modulator for BPSK modulation, a frequency modulator for FSK transmissions, or a dual, quadrature arrangement for QPSK or related modulation types.

For transmission via a nominal primary carrier frequency of ~915 MHz, two RF oscillator sources are provided, one at 915.585 MHz 45, another at 905.585 MHz 46. A standard high-stability logic-type 10.23-MHz oscillator 47 is used to generate a chipping clock for the polynomial generator 53 so that the nominal direct-sequence rate of 1.023 Mchips per second is provided as discussed in connection with FIG. 2. A divide-by-10 circuit 74 is employed to divide the clock signal down to 1.023 MHz to provide the actual chipping clock. The 10.23-MHz clock 47 also drives frequency synthesizer logic block 75, which regulates the frequencies of the two RF oscillators 45 and 46. The spreading modulator 65 modulates the 915.585-MHz carrier signal with the direct-sequence signal to obtain the primary spread-spectrum signal, which is provided as an output of the spreading modulator 65.

The 905.355-MHz signal from the oscillator 46 is similarly provided to a second spreader 81 driven from the same spreading-code output gate 63, whose output is spread with the same modulation as the primary carrier. This auxiliary-signal output is then provided to a summer 85. The summer 85 combines the signals from the spreading modulators 65 and 81 (not necessarily at the same amplitudes) to form a composite signal for transmission. The output of the summer is then provided to an amplifier 87, which is coupled to a suitable antenna 89 of conventional design mounted on the tag.

Still referring to FIG. 3, a tag receiver circuit 33 is operative to receive an interrogation signal, transmitted by the system, examine information contained in the interrogation signal and determined if the tag has been interrogation, and if so, respond to the interrogation by transmitting (chirping) out its signal. The tag receiver receives an interrogation signal transmitted from the controller 18 or alternatively from a receiver 15, depending upon system configuration. The tag receiver demodulates the interrogation signal and provides a digital tag interrogation identifier signal to the tag interrogation identifier memory 35, where it is temporarily stored for utilization. The tag interrogation identifier memory is coupled to the comparator 38, which is also coupled to the tag identifier memory 50.

In response to an indication by the comparator 38 that the particular tag has a tag identifier stored in its tag identifier memory 50 that corresponds to the tag interrogation identifier stored in the tag interrogation identifier memory 35, a signal is provided to the power circuit 41 to stimulate the tag to chirp out or transmit its signals in accordance with the techniques described herein. In this manner, a tag 12 only transmits its signals when interrogated and is thereby enabled to conserve memory and minimize transmissions from plural tag simultaneously which could cause interference and delays in synchronization in a identification.

In response to an indication by the comparator 38 that the particular tag does not have a tag identifier stored in its tag identifier memory 50 that corresponds to the tag interrogation identifier stored in the tag interrogation identifier memory 35, a signal is provided from the comparator to erase the contents of the tag interrogation identifier memory 35 to prepare it for another interrogation.

The power circuit 41 comprises a power circuit timer 101 and a switch 103, coupled to a battery B. In response to a signal from the comparator 38, the power circuit timer 101 activates for a predetermined time to switch on the battery B to provide power to the tag transmitter circuit 30. It will be appreciated that the tag receiver 33, comparator 38, and power circuit timer 101 are continuously powered by the battery through a power connection prior to the switch, but these are preferably constructed with low-power semiconductor components for power conservation. It will also be appreciated that the transmitter 30 is generally expected to be the major drain on the battery power.

Also illustrated in FIG. 3 is the general structure of a typical receiver 15. Although more details of the receiver architecture are described below, the basic receiver includes components operative for extracting the three ranging elements of coarse ranging, intermediate or medium ranging, and fine ranging. A receiver amplifier 140 is coupled to an antenna 142 associated with the receiver and operative to receive signals from within the area of coverage 20 of the system. Signals from the amplifier 140 are coupled to a despreader 150, a demodulator 153, and a phase detector 155.

The despreader 150 is operative to extract the direct-sequence code and determine the relative phase shift of the direct-sequence code, and thereby determine the coarse ranging amount for location of a tag.

The demodulator 153 is operative to detect the 10.23-MHz difference signal and thereby provide the intermediate ranging information with a total full-scale range of approximately 29 meters. The phase detector 155 is operative for detecting the instantaneous phase of the carrier signal transmitted by a tag relative to a phase reference and thereby provide fine ranging information that resolves to a full-scale span of approximately one foot or ~0.3 meters. The outputs of the spreader, demodulator, and phase detector are provided to logic 160 associated with each receiver that performs a range calculation, which in turn is communicated to the controller 18 which carries out the triangulation calculation for locating the tag.

Figure 4:
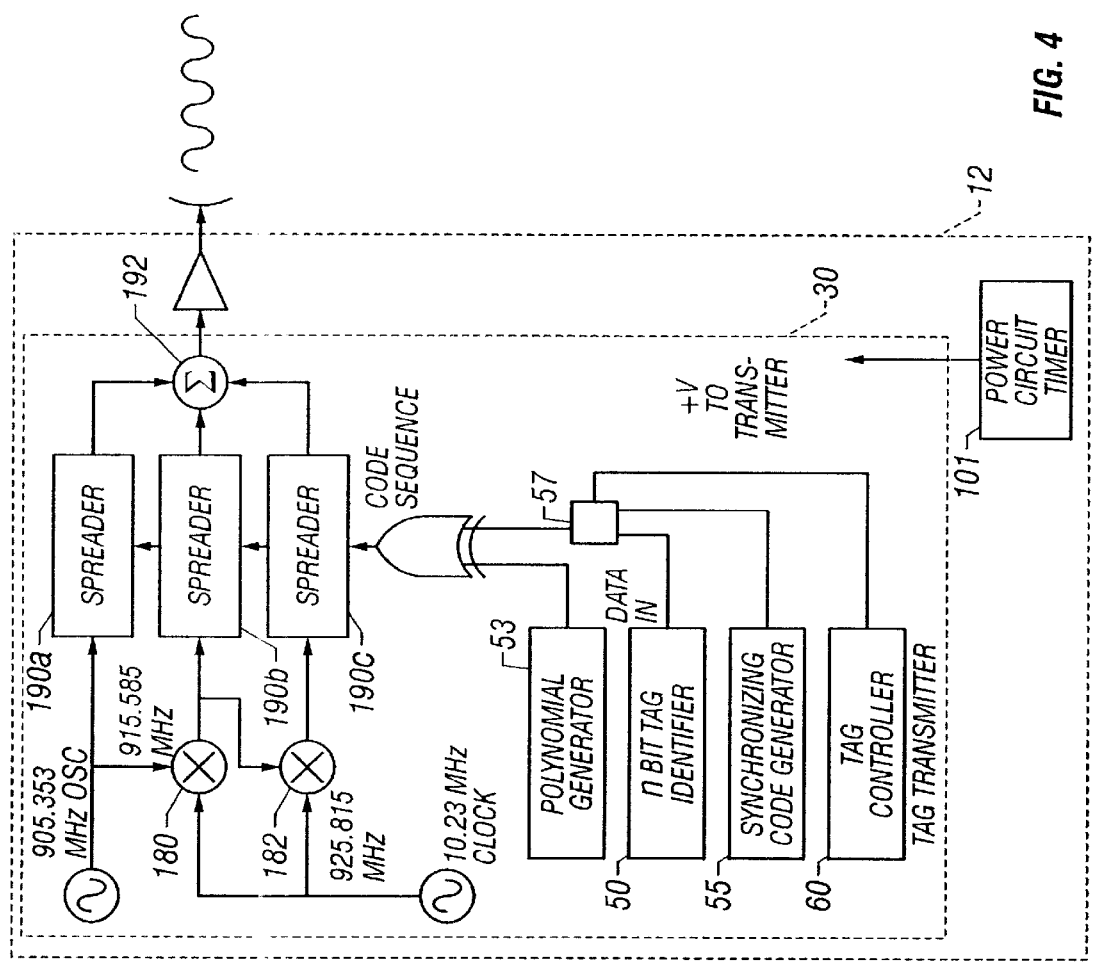
FIG. 4 is a block diagram of an alternative tag circuit, representing an embodiment of the invention.

FIG. 4 illustrates an alternative embodiment of a tag circuit 12', which is different in at least two aspects from the embodiment shown in FIG. 3. First, the alternative tag 12' includes a power circuit timer 101' which is "free-running," that is power is provided for transmissions according to a timing scheme instead of an interrogation scheme. Second, a different modulation scheme for communicating the three different ranging components for coarse, intermediate, and fine ranging is implemented, with components of an alternative transmitter circuit 30'. It should be understood that these two aspects are independent of each other and may be employed independently, or together as shown.

The alternative power circuit timer 101' is operative to provide power to the transmitter 30' at periodic or random interval, as opposed to responsive to receipt of a predetermined interrogation signal. A system constructed utilizing tags with transmitters that transmit periodically or randomly suffer the disadvantage of possible interference from plural tags transmitting simultaneously, and might not provide as long a battery life as an interrogated system, unless the period is selected to be sufficiently long between transmissions.

A tag that transmits at random intervals is preferably constrained to transmit at least once randomly within a predetermined time period so as to minimize the potential for indeterminate acquisition delay. If the delay between transmissions is too long in systems utilizing periodic or random transmission, the time required for synchronization and identification, and thereby location of a particular tag, might be commensurately delayed. However, some applications of the invention may find this particular embodiment more suitable.

The alternative tag transmitter 30' provides two difference signals at 10.23 MHz separation, one at 905.353 MHz and the other at 925.815 MHz, centered about a 915.585 MHz signal, to provide two difference signals at the outputs of the receiver phase detectors. The components of synchronizing code generator 55, tag controller 60, polynomial generator 53, and tag identifier memory 50 are the same as for the tag transmitter 30. The primary difference resides in provision of the 10.23-MHz clock 70 to first balanced mixer 180 and to a second balanced mixer 182. The 905.353-MHz carrier signal is provided to the first mixer 180 where it is mixed with a 10.23-MHz signal to provide a 915.585-MHz signal. The 915.585-MHz signal is provided to the second mixer 182, where it is again mixed with the 10.23-MHz signal to provide a third signal at 925.815 MHz. Each of these three signals is provided to spreaders 190a, 190b, 190c, all similarly constructed, where the signals are each modulated with the direct-sequence code via exclusive OR-gate 63. The signals from the spreaders 190a, 190b, 190c are then summed at a summer 192, amplified, and then transmitted in the same manner as in the tag transmitter 30.

Figure 5:
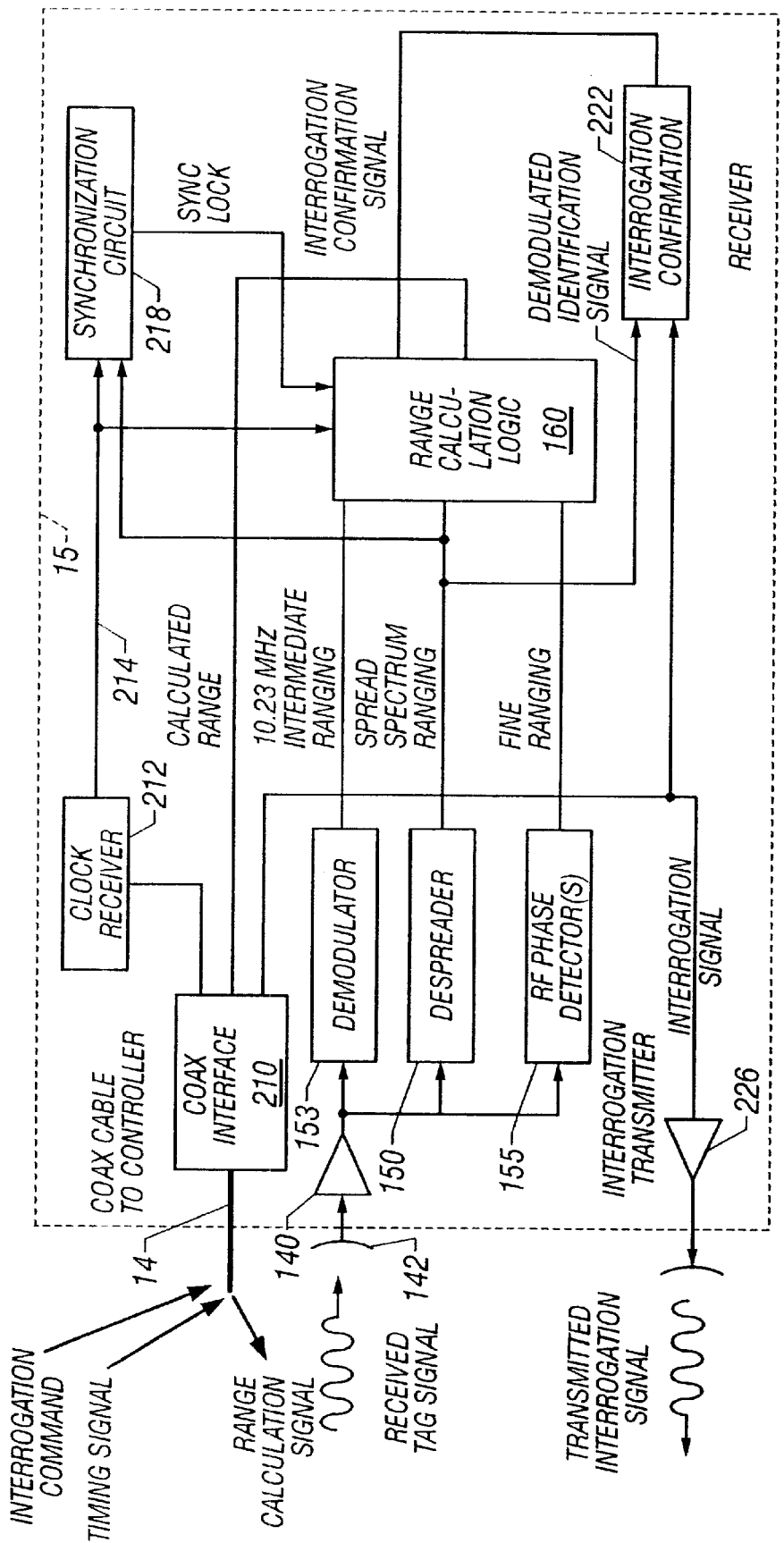
FIG. 5 is a more detailed diagram of a receiver circuit, representing an embodiment of the invention.

FIG. 5 is a more detailed block diagram of a receiver 15. FIG. 5 shows the range calculation logic 160 as well as components for transmitting an interrogation signal from a receiver for embodiments of the invention wherein an interrogation signal is transmitted by a plurality of receivers as opposed to being transmitted by the controller.

The receiver 15 includes a coax interface 210 that provides communications between the controller 18 and the receiver 15. The coax interface 210 is coupled via a coaxial cable to the controller 18 and receives a precision timing signal from the controller 18 and an interrogation command. The receiver provides a range calculation signal back to the controller indicative of the calculated range from the receiver to an interrogated tag, for use by the controller in the position triangulation computations. The preferred connection between the coax interface 210 and the controller 18 is a coaxial cable capable of carrying up to 1-GHz modulated signals onto which are imposed digital signals corresponding to the interrogation command, the timing signal, and the range calculation signal, in a full duplex manner. Those skilled in the art will understand that various techniques exist for imposing these signals on a conventional coaxial cable so as to provide a highly stable timing signal which is required for the precise computations as contemplated in the invention.

In the receiver 15, the coax interface 210 is coupled to a clock receiver 212, which extracts a highly stable clock reference signal that is employed for the ranging calculations. A clock signal is provided on line 214 to the range calculation logic 160 and to a synchronization circuit 218. The synchronization circuit 218 receives the coarse ranging signal from the despreader 150 and is operative to detect the synchronization circuit pattern so as to determine when the receiver is locked to the particular tag that is presently transmitting a signal. Therefore, the synchronization circuit 218 is operative to detect and lock to the synchronizing code provided by a synchronizing code generator 55 as in FIG. 3. When synchronization is detected, a SYNC LOCK signal from the synchronization circuit 218 is provided to the range calculation logic 160 so as to indicate that range calculations can take place since the particular interrogated tag is transmitting its signal and that the signal has been detected by the receiver.

The coax interface 210 also provides an INTERROGATION signal which is received from the controller 18. It will be recalled from the discussion in connection with FIG. 3 that the tag identifier information that identifies the particular tag transmitting its information is modulated onto the DS code. This signal is demodulated in the receiver 15 by the despreader 150 and provided as the spread-spectrum ranging signal not only to the synchronization circuit 218 but also to the range calculation logic 160 and to an interrogation confirmation circuit 222. Another input to the interrogation confirmation circuit 222 is the INTERROGATION signal from the coax interface 210.

The INTERROGATION signal comprises digital information identifying the particular tag that is to begin transmitting so that it can be located by the system. Thus, the interrogation confirmation circuit 222 compares the identification of the particular tag that is being interrogated, as represented by the INTERROGATION signal, to the data demodulated from the despreader 150, so as to confirm that signals presently being received by the receiver are indeed those of the particular interrogated tag. A confirmation that the particular tag interrogated is transmitting is provided as a INTERROGATION CONFIRMATION signal, which is provided to the range calculation logic 160 and used to enable the range calculation and validate it.

The output of the range calculation logic 160 is a signal denominated CALCULATED RANGE, which is provided to the coax-interface 210. The coax interface then is operative to modulate this information in an appropriate protocol or format for communication as the RANGE CALCULATION SIGNAL that is provided to the controller 18 for use in position triangulation computations.

The INTERROGATION signal from the coax interface 210 is also provided to an interrogation transmitter 226, which transmits the signal as a TRANSMITTED INTERROGATED SIGNAL from an antenna associated with the receiver. It is this signal which stimulates a particular tag to chirp out its data so as to enable identification and location.

In embodiments of the system wherein an interrogation signal is transmitted from a more central location, e.g. from an antenna associated with the controller, as opposed to a dispersed transmission from plural receivers, corresponding similar transmitting means to that described for the interrogation transmitter 226 would be employed.

Figure 6:
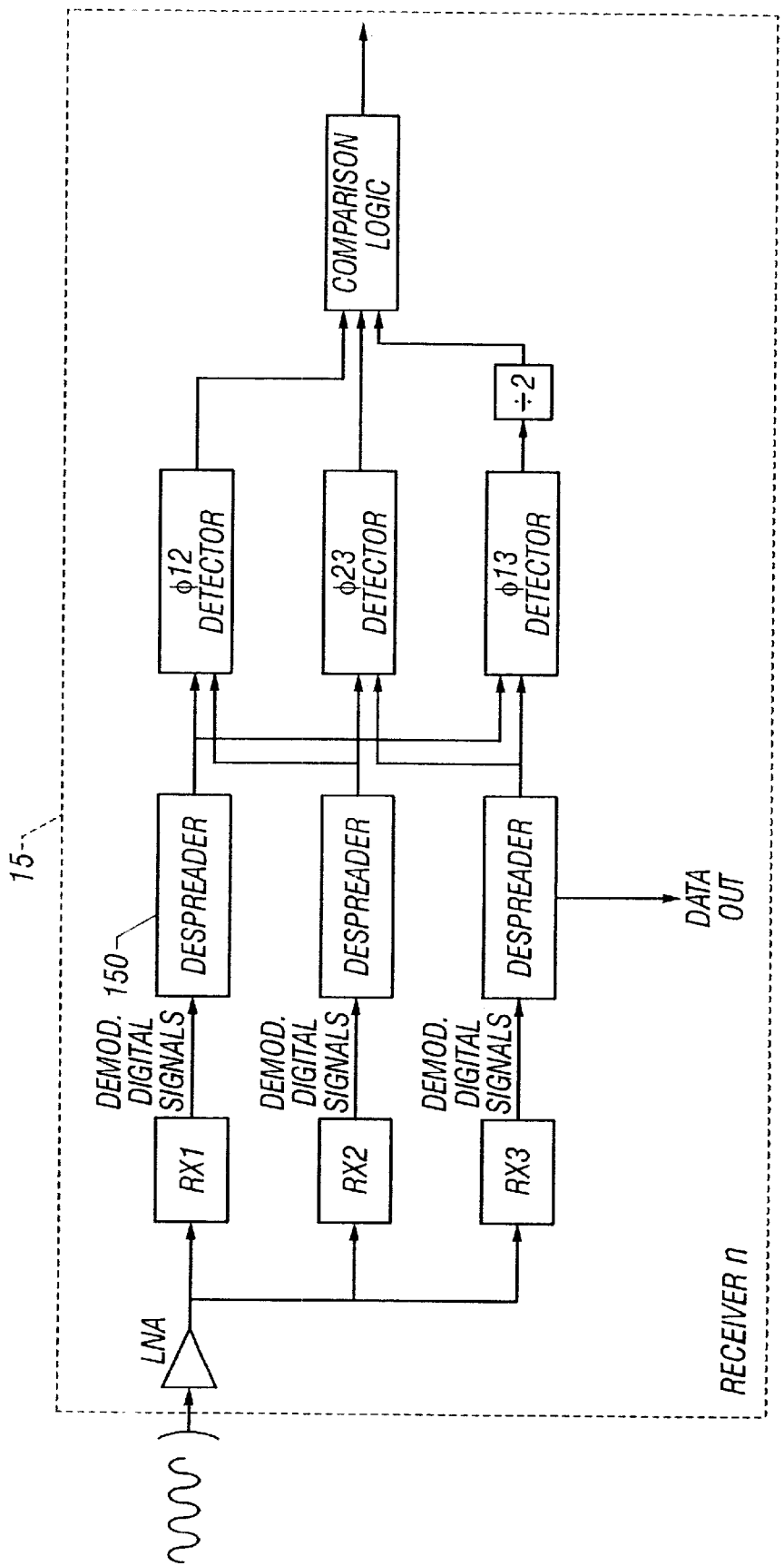
FIG. 6 illustrates an alternative embodiment of a receiver circuit, representing an embodiment of the invention.

FIG. 6 illustrates an alternative embodiment of a receiver 15' that would be utilized in an application where the signal transmitted consists of three different carriers for superior multipath and/or interference immunity; the corresponding tag/transmitter architecture is shown in FIG. 4. In this case, each separate carrier is spread, usually (but not necessarily) according to a common PN code. The relative difference-signal phases are extracted in the receiver, both for the 1-2 and 2-3 frequency pairs at 10.23 MHz, plus the 1-3 difference signal at 20.46 MHz. This latter signal is divided by two in a flip-flop and compared in a logic circuit with the other two 10.23-MHz components. If multipath or interference has degraded one or even two of these 3 signals so much as to be unusable, the logic will select the remaining best-quality signals to determine the range. A lack of consistency between the 3 signals may also be used to alert the system user to the degraded-signal conditions.

Figure 7:
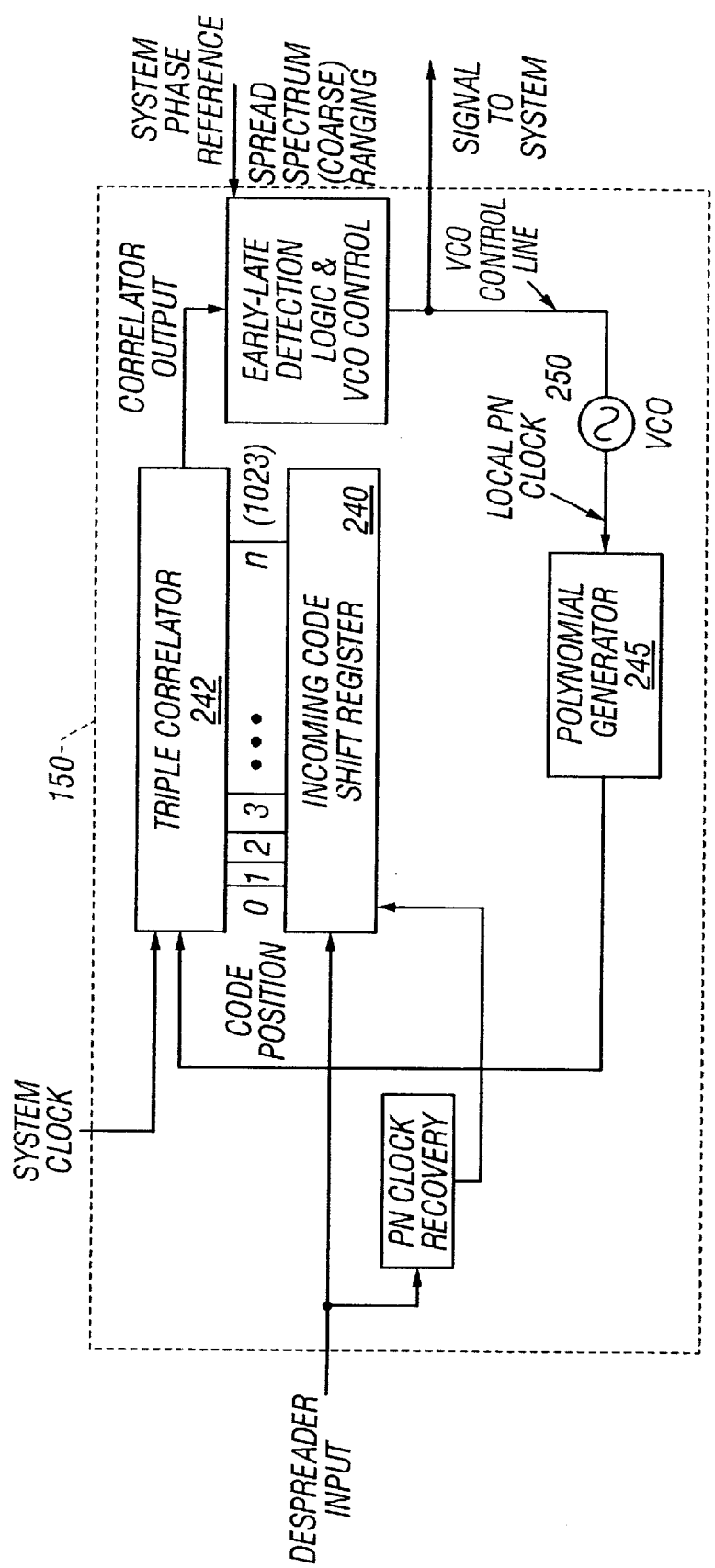
FIG. 7 is a block diagram of a despreader utilized in a receiver circuit, representing an embodiment of the invention.

FIG. 7 illustrates the structure of the conventional despreader 150 that is employed to demodulate the spread-spectrum signal and derive the coarse ranging information C employed in the distance calculations. The despreader 150 receives a demodulated digital input logic-level signal from a typical RF receiver subsystem and provides the signal to an incoming code shift register 240. The shift register has the same bit length as the code epoch, which is 1023 in a preferred embodiment. Each output of the incoming code shift register is coupled to a correlator 242, which receives its input from a polynomial generator 245. The polynomial generator 245 generates the same pseudorandom direct-sequence (DS) code as the polynomial generator 53 in the tag's transmitter. The rate at which the pseudorandom code is generated by the polynomial generator 245 is determined by a clock 250 which is constructed from a voltage controlled oscillator (VCO). The voltage that drives the VCO 250 is derived from the CORRELATOR OUTPUT signal provided as the output of the correlator 242.

As is known in the art, code sequence autocorrelation value is typically expressed as the number of agreements minus the number of disagreements between the bits of the polynomial in the incoming code shift register 240 and the polynomial sequence provided by the PN generator 245, when the codes are compared chip by chip. As discussed in the literature and as will be known to those skilled in the art, when the code phase between the incoming code as detected by a receiver exactly matches that of the code generated internally of the despreader, the correlation will be at its maximum value. Again as is widely practiced in the spread-spectrum art, the correlator block actually performs comparisons between 3 versions of the PN code, one at the nominal phase ("on-time"), one advanced by one chip time ("early"), and one delayed by the same amount ("late"). This structure is widely known as an "early-late" correlator; the 3 code phases or times are used to develop a phase- or timing-error signal which drives a local VCO to either advance or retard its phase to match that of the incoming PN code signal. The total phase difference between a reference signal in the receiver and the actual VCO phase of the correlator (once locked) represents the time delay between said reference signal and the RF signal incoming to the receiver. This is precisely the information needed by the central processor in the radiolocation system controller to solve for the tag positions relative to the system receivers, and thus, the facility or venue in question.

Figure 8:
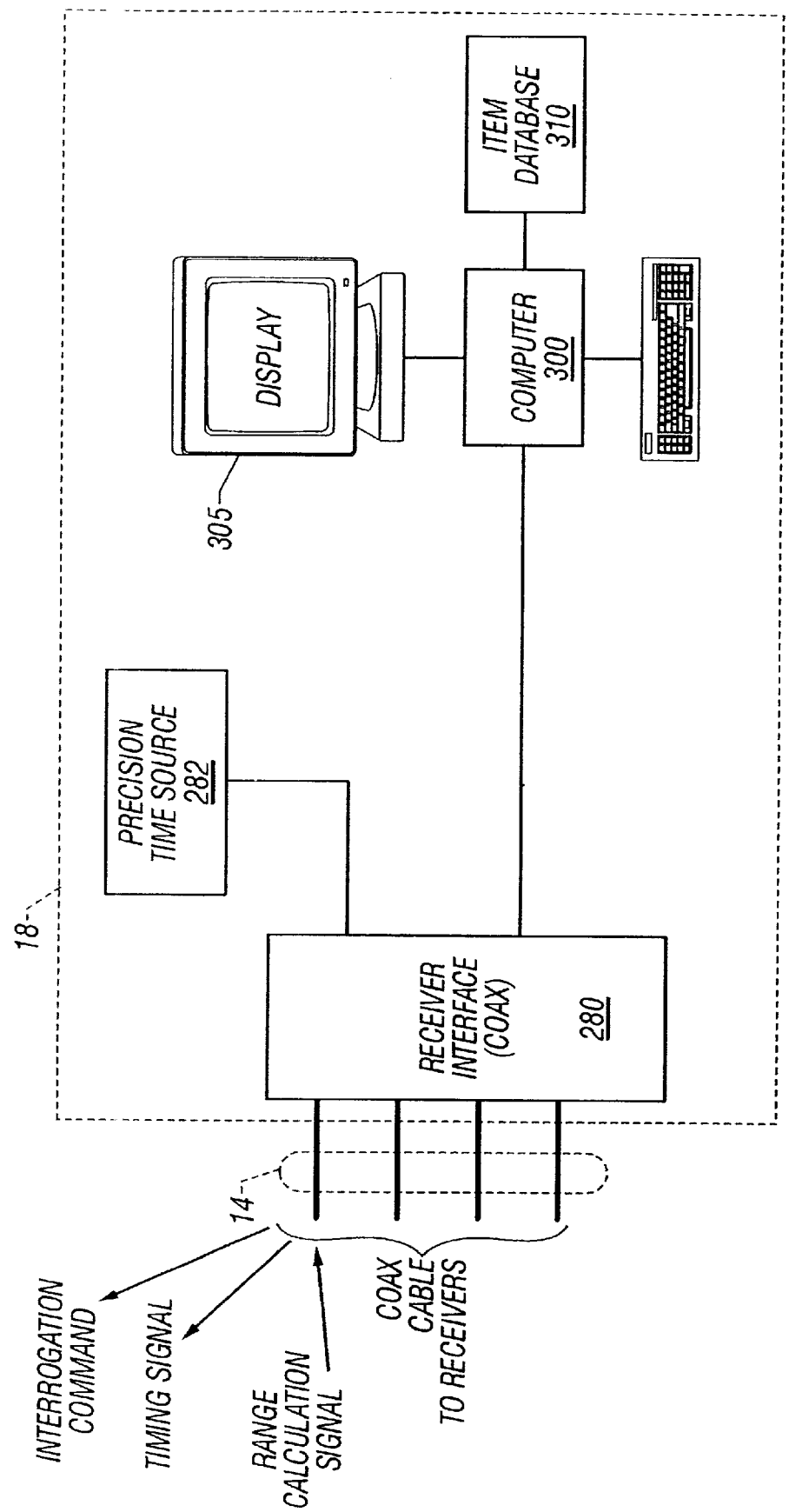
FIG. 8 is a block diagram of a controller utilized in the system shown in FIG. 1.

FIG. 8 illustrates a controller 18. The controller 18 includes a receiver interface 280 which couples the coaxial cables 14 between the controller 18 and the various receivers 15 in the system. As previously discussed, each of the coaxial cables between the controller and the receivers transmits an interrogation command and a timing signal to each receiver, and receives a range calculation signal indicative of a range determined from each of the receivers to an interrogated tag. The receiver interface 280 receives the timing signal from a precision time source 282 which is preferably a phase-stabilized crystal clock. The range calculation signal is provided to a computer 300, which receives all of the range signals from all of the receivers that detect the interrogated tag's signals, and performs the triangulation calculation of the position of the tag. Once determined, the position of the located tag is displayed on a display 305 which displays a rap of the area 20. Preferably, the location of the located item is superimposed on the display 305 in a graphical manner so as to aid operator interpretation.

The controller 18 further includes an item database 310 coupled to the computer 300, in which is stored information associating particular tag identifiers with particular items such as equipment, vehicles, pallets, containers, personnel, etc. Preferably, a suitable icon or other visible indication of the nature of the item being located within the area is displayed on the display 305.

Figure 10:
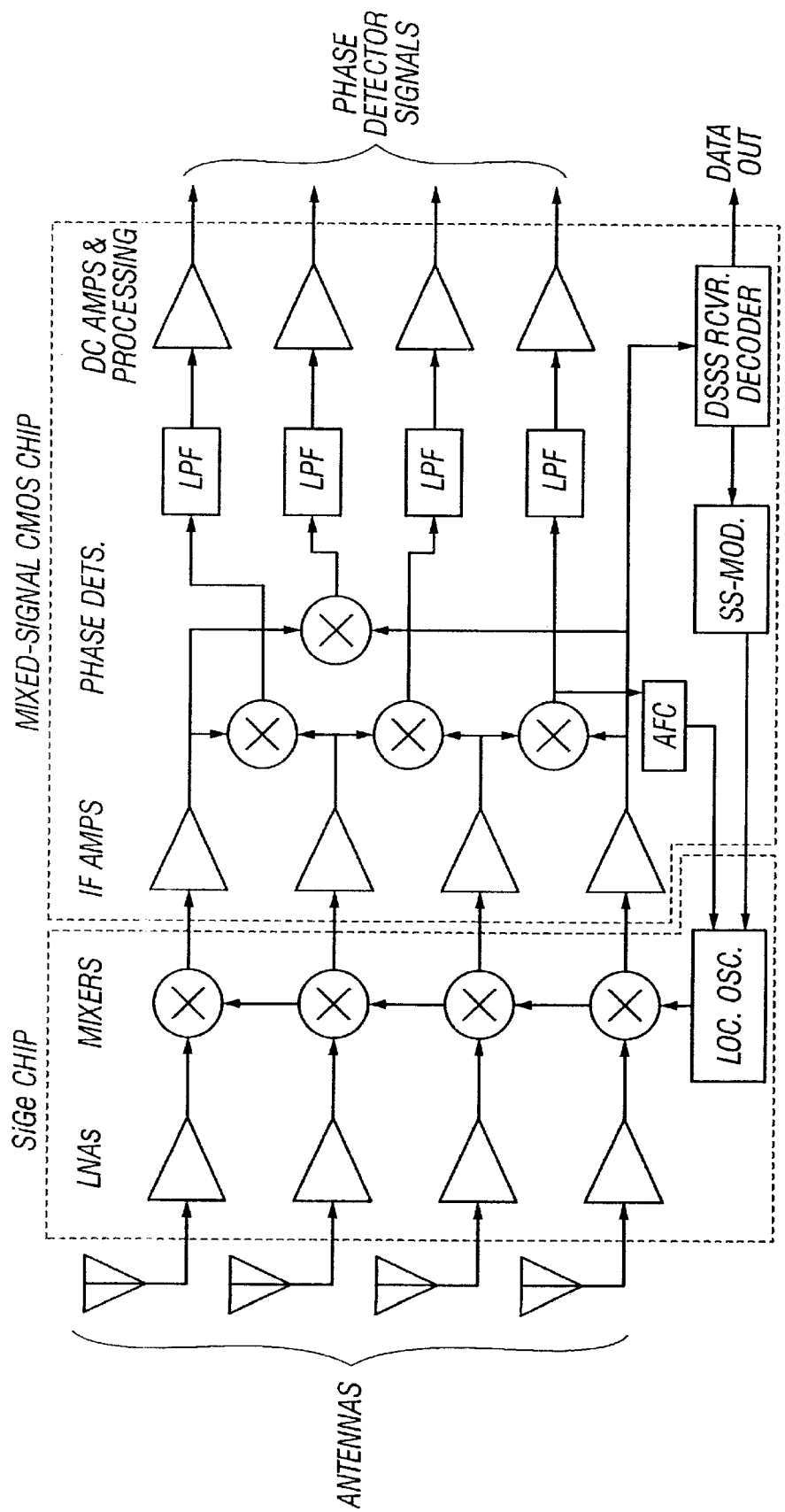
FIG. 10 provides a detailed block diagram of the multiple-channel receiving system signal-processing electronics intended for use with the 4-antenna array of FIG. 9.

The diagram in FIG. 9 illustrates a second type of system embodiment in which a single-unit receiving platform with a close-spaced antenna array can be utilized with the standard transceiving tag unlit of the invention to provide concurrent radiolocation and data-transmission functions in more irregular spaces and/or scenarios demanding simple, rapid system setup in temporary, portable or very low-cost applications. This approach permits a vectorized radiolocation technique which has significantly simpler system setup requirements. The principal implementation advantage, beside the inherently more compact configuration, is that the multiple receivers and downstream pairwise phase detectors can be incorporated into a single custom integrated-circuit chip (ASIC), such as the setup depicted in FIG. 10. The use of parallel circuitry on a common ASIC substrate affords excellent phase tracking between channels and maximizes the use of circuits common to all 4 channels. The device also utilizes an efficient feedback DS spread-spectrum decoder architecture which uses a synchronized, regenerated PN spreading-code to modulate the common local downconverting oscillator; this spread oscillator signal then despreads the 4 channels in parallel to derive the 4 pairwise phase-difference signals at right. Concurrently, the data stream from the tag being located is available from the decoder block at the bottom right.

Practical Applications of the Invention

A practical application of the invention that has value within the technological arts is determining the location of one or more objects (e.g., containers, pallets, vehicles, personnel, patent prosecution files, etc.) within a defined area. There are virtually innumerable uses for the invention, all of which need not be detailed here.

Advantages of the Invention

A system, representing an embodiment of the invention, can be cost effective and advantageous for at least the following reasons. The invention provides a low-cost radiolocation system that provides sufficient gross ranging, with unambiguous intermediate and fine ranging resolution for greater accuracy. The invention provides a radiolocation system where tags for unattended assets can be manufactured with as many components as possible on a single integrated-circuit (IC) chip, for low cost, small size, low power, high reliability, and good repeatability.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials,.but could be fabricated from virtually any suitable materials. Further, although the tag described herein can be a physically separate module, it will be manifest that the tag may be integrated into the apparatus with which it is associated. Furthermore, all the disclosed elements and features of each disclosed embodiment can be combined with, or substituted for, the disclosed-elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements.

The appended claims are not to be interpreted as including means-plus-function limitations, unless such a limitation is explicitly recited in a given claim using the phrase "means for." Expedient embodiments of the invention are differentiated by the appended subclaims.

REFERENCES (1) Kaplan, Elliott D., *The Global Positioning System (GPS)*, Communications Quarterly, Summer 1994, pages 13–27.
(2) Werb, C. and Lanzl, J., *Designing a Positioning System for Finding Things and People Indoors*, IEEE SPECTRUM, September 1998, pages 71–78.
(3) Robert Dixon, *Spread Spectrum Systems with Commercial Applications*, John Wiley & Sons, Inc., New York, N.Y., 1994, pages 307–312.
(4) Peterson, R. L., Ziemer, R. E., and Borth, D. E., *Introduction to Spread-Spectrum Communications*, Prentice Hall, Upper Saddle River, N.J., 1995.

What is claimed is:

1. A method of determining a location of a tag, comprising:
   developing a coarse ranging of the location of the tag by determining a phase of a spread-spectrum code sequence that is transmitted by the tag to a plurality of receivers by modulating a carrier with a spread-spectrum code;
   developing an intermediate ranging of the location of the tag by determining a phase of a difference signal that is transmitted by the tag to the plurality of receivers;
   utilizing the coarse ranging and the intermediate ranging of the location of the tag to determine a set of distances from the tag to each of the plurality of receivers; and
   utilizing the set of distances to triangulate a position of the tag.

2. The method of claim 1, wherein the difference signal is derived from a comparison of said spread-spectrum code sequence and another spread-spectrum code sequence that is transmitted by the tag to the plurality of receivers by modulating another carrier with one member selected from the group consisting of said spread-spectrum code and another spread spectrum code.

3. The method of claim 1 wherein the difference signal is derived from a comparison of said spread-spectrum code sequence and a sideband of the carrier.

4. The method of claim 1, further comprising:
   developing a fine ranging of the location of the tag by determining a phase shift at each of said plurality of receivers between said carrier and a system phase-reference signal that is available to each of said plurality of receivers; and
   utilizing the fine ranging of the location of the tag to determine said set of distances from the tag to each of the plurality of receivers.

5. An electronic medium, comprising a program for performing the method of claim 1.

6. A computer program, comprising computer or machine readable program elements translatable for implementing the method of claim 1.

7. A computer program comprising computer program means adapted to perform the steps of developing a coarse ranging of the location of a tag by determining a phase of a spread-spectrum code sequence that is transmitted by the tag to a plurality of receivers by modulating a carrier with a spread-spectrum code; developing an intermediate ranging of the location of the tag by determining a phase of a difference signal that is transmitted by the tag to the plurality of receivers; utilizing the coarse ranging and the intermediate ranging of the location of the tag to determine a set of distances from the tag to each of the plurality of receivers; and utilizing the set of distances to triangulate a position of the tag when said program is run on a computer.

8. A computer program as claimed in claim 7, embodied on a computer-readable medium.

9. An apparatus, comprising:

a tag including a spread spectrum transmitter; and a plurality of receivers including circuitry to develop a coarse-resolution range value of the location of the tag by determining a phase of a spread spectrum code sequence transmitted by the tag to a plurality of receivers;

circuitry to develop an intermediate-resolution range value of the location of the tag by determining a phase of a difference signal that is transmitted by the tag to the plurality of receivers;

resources utilizing the coarse-resolution and intermediate-resolution range values of the location of the tag to determine a set of distances from the tag to each of the plurality of receivers; and resources utilizing the set of distances to triangulate a position of the tag.

10. A method for transmitting a waveform which comprises deploying the apparatus of claim 9.

11. An apparatus for determining a location of a tag, comprising:

circuitry to develop a coarse-resolution range value of the location of the tag by determining a phase of a spread spectrum code sequence transmitted by the tag to a plurality of receivers;

circuitry to develop an intermediate'-resolution range value of the location of the tag by determining a phase of a difference signal that is transmitted by the tag to the plurality of receivers;

resources utilizing the coarse-resolution and intermediate-resolution range values of the location of the tag to determine a set of distances from the tag to each of the plurality of receivers; and resources utilizing the set of distances to triangulate a position of the tag.

12. The apparatus of claim 11, further comprising:

circuitry to develop a fine-resolution range value of the location of the tag by determining a phase shift at each of said plurality of receivers between said carrier and a system phase-reference signal that is available to each of said plurality of receivers, wherein the resources utilizing the coarse-resolution and intermediate-resolution range values also utilize the fine-resolution range value to determine the set of distances from the tag to each of the plurality of receivers.

* * * * *